US005596042A

United States Patent [19]

Itoh et al.

[11] Patent Number: 5,596,042

[45] Date of Patent: Jan. 21, 1997

[54] OLEFIN THERMOPLASTIC ELASTOMER AND LAMINATE THEREOF

[75] Inventors: Yuichi Itoh; Kyoko Kobayashi; Akira Uchiyama; Toru Takehara, all of Ichihara, Japan

[73] Assignee: Mitsui Petrochemical Industries, Ltd., Tokyo, Japan

[21] Appl. No.: 626,900

[22] Filed: Apr. 4, 1996

Related U.S. Application Data

[63] Continuation of Ser. No. 268,564, Jul. 6, 1994, abandoned.

[30] Foreign Application Priority Data

| | | | |
|---|---|---|---|
| Jul. 8, 1993 | [JP] | Japan | 5-168866 |
| Jul. 8, 1993 | [JP] | Japan | 5-168867 |
| Aug. 26, 1993 | [JP] | Japan | 5-211851 |
| Sep. 29, 1993 | [JP] | Japan | 5-242535 |
| Apr. 27, 1994 | [JP] | Japan | 6-090078 |

[51] Int. Cl.$^6$ .............................. C08L 23/10; C08L 25/08; C08L 53/02

[52] U.S. Cl. ........................ 525/98; 525/92 R; 525/92 A; 525/105; 525/106; 525/194; 525/240; 524/505

[58] Field of Search ................................ 525/92 R, 92 A, 525/98, 105, 106, 194, 240; 524/505

[56] References Cited

U.S. PATENT DOCUMENTS

| | | | |
|---|---|---|---|
| 3,424,649 | 1/1969 | Nyberg et al. | 428/517 |
| 4,287,608 | 9/1981 | Grigo | 525/106 |
| 4,292,222 | 9/1981 | Grigo | 525/106 |
| 4,340,684 | 7/1982 | Bohm et al. | 525/194 |
| 4,889,888 | 12/1989 | Bassi | 525/75 |
| 5,159,016 | 10/1992 | Inoue | 525/92 |
| 5,187,224 | 2/1993 | Hamanaka et al. | 524/505 |
| 5,248,729 | 9/1993 | Inoue | 525/92 |
| 5,298,560 | 5/1994 | Aida | 525/192 |

FOREIGN PATENT DOCUMENTS

| | | |
|---|---|---|
| 0323741 | 7/1989 | European Pat. Off. . |
| 0409580 | 1/1991 | European Pat. Off. . |
| 2300250 | 12/1990 | Japan . |
| 4323238 | 11/1992 | Japan . |
| 2270915 | 3/1994 | United Kingdom . |

OTHER PUBLICATIONS

Database WPI, Section CH, Week 8812, Derwent Publications Ltd., London, GB, AN-88-081178.

*Primary Examiner*—Irina Zemel

*Attorney, Agent, or Firm*—Sherman And Shalloway

[57] ABSTRACT

Olefin thermoplastic elastomers which comprise a partially crosslinked thermoplastic elastomer comprising a crystalline polyolefin resin (A), a block copolymer (B) which is composed of a polymer block of styrene or its derivative and a specific isoprene polymer block, and an olefin rubber (C), and thermoplastic elastomer laminates, having a substrate formed from a specific olefin thermoplastic elastomer or a crystalline polyolefin resin and a skin layer formed from the above-mentioned olefin thermoplastic elastomer, which are excellent in mechanical strength, heat resistance, heat aging resistance, weathering resistance and scratch resistance have been provided by the present invention.

20 Claims, No Drawings

OLEFIN THERMOPLASTIC ELASTOMER AND LAMINATE THEREOF

This application is a continuation, of application Ser. No. 08/268,564, filed Jul. 6, 1994, now abandoned.

FIELD OF THE INVENTION

The present invention relates to olefin thermoplastic elastomers and laminates thereof. More particularly, the invention relates to olefin thermoplastic elastomers which can be molded into articles of high scratch resistance and relates to olefin thermoplastic elastomer laminates of high scratch resistance which can be favorably used for automobile exterior trim parts, etc.

BACKGROUND OF THE INVENTION

Vinyl chloride resins have been conventionally widely used for side protection moles of automobiles. The vinyl chloride resins are very suitable for such uses because they are excellent in scratch resistance and available at a low price. However, the vinyl chloride resins generate harmful gas when burned, and hence there is involved a problem of environmental pollution.

By the way, olefin thermoplastic elastomers are used widely for automobile parts, industrial machine parts, electric and electronic parts, building materials, etc. as elastomers suitable for saving energy or saving natural resource type, particularly as replacements for vulcanized rubbers, because they are lightweight and can be easily recycled.

Further, from the viewpoint of the protection of earth environment, the vinyl chloride resins which generate harmful gas when burned have been recently replaced with the olefin thermoplastic elastomers which generate no harmful gas.

However, the molded articles produced from the conventional olefin thermoplastic elastomers are inferior in scratch resistance to the molded articles produced from the vinyl chloride resins, and therefore, an improvement of the scratch resistance has been eagerly desired for the olefin thermoplastic elastomers.

Under such circumstances as mentioned above, the present inventors have earnestly studied on the olefin thermoplastic elastomers having high scratch resistance and molded articles thereof. As a result, they have found the followings and accomplished the present invention.

(1) When a crystalline polyolefin resin, a specific block copolymer and an olefin rubber are blended in a specific ratio, there can be obtained an olefin thermoplastic elastomer capable of providing a molded article of high scratch resistance.

(2) When a partially or perfectly crosslinked thermoplastic elastomer which comprises a crystalline polyolefin resin and an olefin rubber, and a specific block copolymer are blended in a specific ratio, there can be obtained an olefin thermoplastic elastomer capable of providing a molded article of high scratch resistance.

(3) When a crystalline polyolefin resin (or a thermoplastic elastomer), a specific block copolymer, and any one of silicone oil, an ester of aliphatic alcohol and a dicarboxylic acid or a fatty acid and a fluorine polymer are blended in a specific ratio, there can be obtained an olefin thermoplastic elastomer capable of providing a molded article of high scratch resistance.

(4) When a laminate comprising a substrate which is formed from a partially or perfectly crosslinked thermoplastic elastomer comprising a crystalline polyolefin resin and an olefin rubber and a skin layer which is formed from a thermoplastic elastomer comprising a crystalline polyolefin resin and a specific block copolymer in a specific ratio is prepared, there can be obtained a thermoplastic elastomer laminate of high scratch resistance and high heat resistance which is lightweight, can be easily recycled and generate no harmful gas when burned.

(5) When a laminate comprising a substrate which is formed from a crystalline polyolefin resin and a skin layer which is formed from a thermoplastic elastomer comprising a crystalline polyolefin resin and a specific block copolymer in a specific ratio is prepared, there can be obtained a thermoplastic elastomer laminate of high scratch resistance and high heat resistance which is lightweight, can be easily recycled and generate no harmful gas when burned.

OBJECT OF THE INVENTION

The present invention is intended to solve such problems associated with the prior art technique as mentioned above, and it is an object of the invention to provide olefin thermoplastic elastomers capable of providing molded articles of high scratch resistance which are lightweight, can be easily recycled, and generate no harmful gas even when subjected to thermal disposal.

It is another object of the invention to provide thermoplastic elastomer laminates of high scratch resistance and high heat resistance which are lightweight, can be easily recycled, and generate no harmful gas even when subjected to thermal disposal.

SUMMARY OF THE INVENTION

The first olefin thermoplastic elastomer according to the invention comprises a partially crosslinked thermoplastic elastomer which comprises:

[I] a crystalline polyolefin resin (A) in an amount of 20 to 80 parts by weight;

[II] a block copolymer (B) in an amount of 15 to 75 parts by weight, which may be hydrogenated and comprises:

(a) a polymer block of styrene or its derivative, and (b) a polymer or copolymer block which is an isoprene polymer block or an isoprene/butadiene copolymer block and contains at least 40% of isoprene units bonding at 1,2- or 3,4-positions relative to the total isoprene units; and

[III] an olefin rubber (C) in an amount of 5 to 65 parts by weight;

the total amount of said components (A) , (B) and (C) being 100 parts by weight.

The second olefin thermoplastic elastomer according to the invention comprises an olefin thermoplastic elastomer which is partially crosslinked and comprises:

[I] a crystalline polyolefin resin (A) in an amount of 20 to 85 parts by weight;

[II] a block copolymer (B) in an amount of 15 to 80 parts by weight, which may be hydrogenated and comprises:

(a) a polymer block of styrene or its derivative, and (b) a polymer or copolymer block which is an isoprene polymer block or an isoprene/butadiene copolymer block and contains at least 40% of isoprene units bonding at 1,2- or 3,4-positions relative to the total isoprene units, the total amount of said components (A) and (B) being 100 parts by weight; and

[III] at least one element selected from the group consisting of (a) silicone oil, (b) an ester of aliphatic alcohol and a dicarboxylic acid or a fatty acid and (c) a fluorine polymer in an amount of 0.01 to 10 parts by weight.

The third olefin thermoplastic elastomer according to the invention comprises an olefin thermoplastic elastomer comprising:

[I] a thermoplastic elastomer [1] in an amount of 10 to 80 parts by weight, which comprises a crystalline polyolefin resin (A) and an olefin rubber (C) and is partially or perfectly crosslinked; and

[II] a block copolymer (B) in an amount of 20 to 90 parts by weight, which may be hydrogenated and comprises:

(a) a polymer block of styrene or its derivative, and (b) a polymer or copolymer block which is an isoprene polymer block or an isoprene/butadiene copolymer block and contains at least 40% of isoprene units bonding at 1,2- or 3,4-positions relative to the total isoprene units;

the total amount of said components [1] and (B) being 100 parts by weight.

The fourth olefin thermoplastic elastomer according to the invention comprises an olefin thermoplastic elastomer comprising:

[I] a thermoplastic elastomer [1] in an amount of 10 to 80 parts by weight, which comprises a crystalline polyolefin resin (A) and an olefin rubber (C) and is partially or perfectly crosslinked;

[II] a block copolymer (B) in an amount of 20 to 90 parts by weight, which may be hydrogenated and comprises:

(a) a polymer block of styrene or its derivative, and (b) a polymer or copolymer block which is an isoprene polymer block or an isoprene/butadiene copolymer block and contains at least 40% of isoprene units bonding at 1,2- or 3,4-positions relative to the total isoprene units, the total amount of said components [1] and (B) being 100 parts by weight; and

[III] at least one element selected from the group consisting of (a) silicone oil, (b) an ester of aliphatic alcohol and a dicarboxylic acid or a fatty acid and (c) a fluorine polymer in an amount of 0.01 to 10 parts by weight.

The first thermoplastic elastomer laminate according to the invention is a thermoplastic elastomer laminate comprising:

[I] a substrate formed from a thermoplastic elastomer [2] which comprises a crystalline polyolefin resin (A) and an olefin rubber (C) and is partially or perfectly crosslinked; and

[II] a skin layer formed from a thermoplastic elastomer [3] which comprises:

a crystalline polyolefin resin (A) in an amount of 20 to 85 parts by weight, and a block copolymer (B) in an amount of 15 to 80 parts by weight, which may be hydrogenated and comprises:

(a) a polymer block of styrene or its derivative, and (b) a polymer or copolymer block which is an isoprene polymer block or an isoprene/butadiene copolymer block and contains at least 40% of isoprene units bonding at 1,2- or 3,4-positions relative to the total isoprene units, the total amount of said components (A) and (B) being parts by weight.

The second thermoplastic elastomer laminate according to the invention is a thermoplastic elastomer laminate comprising:

[I] a substrate formed from a thermoplastic elastomer [2] which comprises a crystalline polyolefin resin (A) and an olefin rubber (C) and is partially or perfectly crosslinked; and

[II] a skin layer formed from a thermoplastic elastomer which is partially crosslinked and comprises:

a crystalline polyolefin resin (A) in an amount of 20 to 80 parts by weight, a block copolymer (B) in an amount of 15 to 75 parts by weight, which may be hydrogenated and comprises:

(a) a polymer block of styrene or its derivative, and (b) a polymer or copolymer block which is an isoprene polymer block or an isoprene/butadiene copolymer block and contains at least 40% of isoprene units bonding at 1,2- or 3,4-positions relative to the total isoprene units, and an olefin rubber (C) in an amount of 5 to 65 parts by weight, the total amount of said components (A), (B) and (C) being 100 parts by weight.

The third thermoplastic elastomer laminate according to the invention is a thermoplastic elastomer laminate comprising:

[I] a substrate formed from a thermoplastic elastomer [2] which comprises a crystalline polyolefin resin (A) and an olefin rubber (C) and is partially or perfectly crosslinked; and

[II] a skin layer formed from a thermoplastic elastomer which comprises:

a thermoplastic elastomer [1] in an amount of 10 to 80 parts by weight, which comprises a crystalline polyolefin resin (A) and an olefin rubber (C) and is partially or perfectly crosslinked, and a block copolymer (B) in an amount of 20 to 90 parts by weight, which may be hydrogenated and comprises:

(a) a polymer block of styrene or its derivative, and (b) a polymer or copolymer block which is an isoprene polymer block or an isoprene/butadiene copolymer block and contains at least 40% of isoprene units bonding at 1,2- or 3,4-positions relative .to the total isoprene units, the total amount of said components [1] and (B) being 100 parts by weight.

The fourth thermoplastic elastomer laminate according to the invention is a thermoplastic elastomer laminate comprising:

[I] a substrate formed from a crystalline polyolefin resin; and

[II] a skin layer formed from a thermoplastic elastomer which comprises:

a crystalline polyolefin resin in an amount of 20 to 85 parts by weight, and a block copolymer (B) in an amount of 15 to 80 parts by weight, which may be hydrogenated and comprises:

(a) a polymer block of styrene or its derivative, and (b) a polymer or copolymer block which is an isoprene polymer block or an isoprene/butadiene copolymer block and contains at least 40% of isoprene units bonding at 1,2- or 3,4-positions relative to the total isoprene units, the total amount of said crystalline polyolefin resin and said component (B) being 100 parts by weight.

The fifth thermoplastic elastomer laminate according to the invention is a thermoplastic elastomer laminate comprising:

[I] a substrate formed from a crystalline polyolefin resin; and

[II] a skin layer formed from a thermoplastic elastomer which is partially crosslinked and comprises:

a crystalline polyolefin resin (A) in an amount of 20 to 80 parts by weight, a block copolymer (B) in an amount of 15 to 75 parts by weight, which may be hydrogenated and comprises:

(a) a polymer block of styrene or its derivative, and (b) a polymer or copolymer block which is an isoprene polymer block or an isoprene/butadiene copolymer block and contains at least 40% of isoprene units bonding at 1,2- or 3,4-positions relative to the total isoprene units, and an olefin rubber (C) in an amount of 5 to 65 parts by weight, the total amount of said components (A), (B) and (C) being 100 parts by weight.

The sixth thermoplastic elastomer laminate according to the invention is a thermoplastic elastomer laminate comprising:

[I] a substrate formed from a crystalline polyolefin resin; and

[II] a skin layer formed from a thermoplastic elastomer which comprises:

a thermoplastic elastomer [1] in an amount of 10 to 80 parts by weight, which comprises a crystalline polyolefin resin (A) and an olefin rubber (C) and is partially or perfectly crosslinked, and a block copolymer (B) in an amount of 20 to 90 parts by weight, which may be hydrogenated and comprises:

(a) a polymer block of styrene or its derivative, and (b) a polymer or copolymer block which is an isoprene polymer block or an isoprene/butadiene copolymer block and contains at least 40% of isoprene units bonding at 1,2- or 3,4-positions relative to the total isoprene units, the total amount of said components [1] and (B) being parts by weight.

DETAILED DESCRIPTION OF THE INVENTION

The olefin thermoplastic elastomers and the laminates thereof according to the invention will be described in detail hereinafter.

The first olefin thermoplastic elastomer of the invention is now described.

The first olefin thermoplastic elastomer according to the invention comprises a partially crosslinked thermoplastic elastomer which comprises:

[I] a crystalline polyolefin resin (A);

[II] a block copolymer (B) which may be hydrogenated and comprises:

(a) a polymer block of styrene or its derivative, and (b) an isoprene polymer block or a specific isoprene/butadiene copolymer block; and

[III] an olefin rubber (C).

The first olefin thermoplastic elastomer of the invention may further comprise a crystalline polyolefin resin other than the partially crosslinked thermoplastic elastomer.

Crystalline Polyolefin Resin (A)

The crystalline polyolefin resin (A) for the use in the invention is, for example, a homopolymer or a copolymer of an α-olefin having 2 to 20 carbon atoms.

Examples of the crystalline polyolefin resin (A) include homopolymers and copolymers described below.

(1) Ethylene homopolymer

The ethylene homopolymer may be prepared by any one of a low-pressure process and a high-pressure process.

(2) Copolymers of ethylene and not more than 10% by mol of α-olefins other than ethylene or vinyl monomers such as vinyl acetate and ethyl acrylate (3) Propylene homopolymer (4) Random copolymers of propylene and not more than 10% by mol of α-olefins other than propylene (5) Block copolymers of propylene and not more than 30% by mol of α-olefins other than propylene (6) 1-Butene homopolymer (7) Random copolymers of 1-butene and not more than by mol of α-olefins other than 1-butene (8) 4-Methyl-1-pentene homopolymer (9) Random copolymers of 4-methyl-1-pentene and not more than 20% by mol of α-olefins other than 4-methyl-1-pentene Examples of the α-olefins include ethylene, propylene, 1-butene, 4-methyl-1-pentene, 1-hexene and 1-octene.

Of the above crystalline polyolefin resins, particularly preferred are a propylene homopolymer and a propylene/α-olefin copolymer having a propylene content of not less than 50% by mol.

The crystalline polyolefin resins described above can be used singly or in combination.

The crystalline polyolefin resin (A) has a melt flow rate (MFR, measured in accordance with ASTM D 1238 at 230° C. under a load of 2.16 kg,) of preferably 0.01 to 100 g/10 min, more preferably 0.3 to 70 g/10 min.

The crystallinity of the crystalline polyolefin resin (A), as measured by X-ray diffractometry, is in the range of usually 5 to 100%, preferably 20 to 80%.

In the first olefin thermoplastic elastomer of the invention, the crystalline polyolefin resin (A) is used in an amount of 20 to 80 parts by weight, preferably 30 to 70 parts by weight, more preferably 35 to 65 parts by weight, based on 100 parts by weight of the total amount of the crystalline polyolefin resin (A), the block copolymer (B) and the olefin rubber (C).

If the crystalline polyolefin resin (A) is used in such an amount as defined above, a thermoplastic elastomer having good moldability and capable of providing a molded article excellent in scratch resistance and heat resistance can be obtained.

Block Copolymer (B)

The block copolymer (B) for the use in the invention comprises (a) a polymer block of styrene or its derivative and (b) an isoprene polymer block or an isoprene/butadiene copolymer block, and may be hydrogenated.

The polymer component constituting the block (a) is styrene or its derivative.

Examples of styrene and its derivatives include α-methylstyrene, 3-methylstyrene, 4-propylstyrene, 4-cyclohexylstyrene, 4-dodecylstyrene, 2-ethyl-4benzylstyrene and 4-(phenylbutyl)styrene. The polymer component constituting the block (a) is preferably styrene or α-methylstyrene.

The polymer or the copolymer constituting the block (b) is an isoprene polymer or an isoprene/butadiene copolymer, and the following isoprene units bonding to their adjacent bonding units at 1,2-positions (Hereinafter referred to as "1,2-bonds") and 3,4-positions (Hereinafter referred to as "3,4-bonds") in the isoprene polymer portion are contained in an amount of not less than 40%, preferably not less than 45%.

"1,2 -bond":

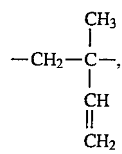

"3,4-bond":

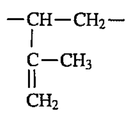

The content of the "1,2-bonds" and the "3,4-bonds" in the isoprene portion can be measured by the method disclosed in Japanese Patent Laid-Open Publication No. 50/1990.

When the content of the "1,2-bonds" and the "3,4-bonds" in the isoprene polymer portion is not less than 40%, a thermoplastic elastomer capable of providing a molded article excellent in scratch resistance can be obtained.

In the block copolymer (B), the polymer block of styrene or its derivative (a) is contained in an amount of preferably 5 to 50% by weight, more preferably 10 to 45% by weight; and the isoprene polymer block or isoprene/butadiene copolymer block (b) is contained in an amount of preferably 95 to 50% by weight, more preferably 90 to 55% by weight.

In the present invention, the block copolymer (B) is preferably hydrogenated. If the hydrogenated block copolymer is used as the block .copolymer, a thermoplastic elastomer capable of providing a molded article excellent in scratch resistance and heat resistance can be obtained.

The block copolymer (B) used in the invention has a melt flow rate (MFR, measured in accordance with ASTM D 1238 at 230° C. under a load of 2.16 kg, ) of preferably 0.01 to 30 g/10 min, more preferably 0.01 to 10 g/10 min. If the block copolymer (B) having such a melt flow rate as defined above is used, a thermoplastic elastomer capable of providing a molded article excellent in scratch resistance can be obtained.

As the block form of the block copolymer (B) used for the invention, a form of block (a)—block (b)—block (a) is most preferred, but the block form is in no way limited thereto.

The block copolymer (B) can be prepared by, for example, the following processes disclosed in Japanese Patent Laid-Open Publication No. 300250/1990.

(1) A process of successively polymerizing styrene or its derivative and an isoprene or an isoprene/butadiene mixture using an alkyllithium compound as an initiator.

(2) A process of polymerizing styrene or its derivative, then polymerizing an isoprene or an isoprene/butadiene mixture and coupling them with a coupling agent.

(3) A process of successively polymerizing an isoprene or an isoprene/butadiene mixture and styrene or its derivative using a dilithium compound as an initiator.

Details of the process for preparing the block copolymer (B) are described in, for example, Japanese Patent Laid-Open Publications No. 300250/1990 and No. 45646/1991.

When the block copolymer (B) prepared as above is subjected to hydrogenation, a hydrogenated block copolymer (B) can be obtained. The block to be hydrogenated is the isoprene polymer block or isoprene/butadiene copolymer block (b).

In the first olefin thermoplastic elastomer of the invention, the block copolymer (B) is used in an amount of 15 to 75 parts by weight, preferably 20 to 60 parts by weight, more preferably 25 to 55 parts by weight, based on 100 parts by weight of the total amount of the crystalline polyolefin resin (A), the block copolymer (B) and the olefin rubber (C).

If the block copolymer (B) is used in such an amount as defined above, a thermoplastic elastomer capable of providing a molded article excellent in scratch resistance and heat resistance can be obtained.

Olefin Rubber (C)

The olefin rubber (C) for the use in the invention is an amorphous random elastomeric copolymer containing an olefin of 2 to 20 carbon atoms in an amount of not less than 50% by mol, and includes an amorphous α-olefin copolymer comprising two or more kinds of α-olefins and an α-olefin/non-conjugated diene copolymer comprising two or more kinds of α-olefins and non-conjugated diene.

Concrete examples of the olefin rubber (C) includes the following rubbers.

(1) Ethylene/α-olefin copolymer rubber [ethylene/α-olefin (molar ratio)=about 90/10 to 50/50)]

(2) Ethylene/α-olefin/non-conjugated diene copolymer rubber [ethylene/α-olefin (molar ratio)=about 90/10 to 50/50)]

(3) Propylene/α-olefin copolymer rubber [propylene/α-olefin (molar ratio)=about 90/10 to 50/50)]

(4) Butene/α-olefin copolymer rubber [butene/α-olefin (molar ratio)=about 90/10 to 50/50)]

Examples of the α-olefins are the same as those constituting the above-mentioned crystalline polyolefin resin (A).

Examples of the non-conjugated dienes include dicyclopentadiene, 1,4-hexadiene, cyclooctadiene, methylene norbornene and ethylidene norbornene.

The ethylene/α-olefin/non-conjugated diene copolymer rubber (2) in which such non-conjugated diene as mentioned above is copolymerized has an iodine value of preferably not more than 25.

Each of the copolymer rubbers (1) to (4) has a Mooney viscosity [$ML_{1+4}$ (100° C.)] of 10 to 250, preferably 30 to 150.

In the first olefin thermoplastic elastomer of the invention, the olefin rubber (C) is used in an amount of 5 to 65 parts by weight, preferably 10 to 50 parts by weight, more preferably 10 to 40 parts by weight, based on 100 parts by weight of the total amount of the crystalline polyolefin resin (A) , the block copolymer (B) and the olefin rubber (C).

If the olefin rubber (C) is used in such an amount as defined above, a thermoplastic elastomer capable of providing a molded article excellent in scratch resistance and flexibility can be obtained.

Other rubbers than the olefin rubber (C) may be used in combination with the olefin rubber (C), with the proviso that the objects of the invention are not marred.

Examples of other rubbers than the olefin rubber (C) include diene rubbers such as styrene/butadiene rubber (SBR), nitrile rubber (NBR), natural rubber (NR) and butyl rubber (IIR), and polyisobutylene rubber.

Block Copolymer (D)

The first olefin thermoplastic elastomer of the invention which is partially crosslinked may further contain, as its component, a block copolymer (D) which may be hydrogenated and comprises a polymer block of styrene or its derivative (c), and an isoprene polymer block or an isoprene/butadiene copolymer block (d) or a butadiene polymer block (e), if necessary, in addition to the crystalline polyolefin resin (A), the block copolymer (B) and the olefin rubber (C).

The polymer component constituting the block copolymer (D) is styrene or its derivative.

Examples of the styrene and its derivatives are the same as those described above for the block copolymer (B). The polymer component for constituting the block copolymer (D) is preferably styrene or α-methylstyrene.

The polymer or the copolymer constituting the block (d) is an isoprene polymer or an isoprene/butadiene copolymer, and the "1,2-bonds" and the "3,4-bonds" in the isoprene polymer portion are contained in an amount of not more than 30%, preferably not more than 25%.

When the content of the "1,2-bonds" and the "3,4-bonds" in the isoprene polymer portion is not more than 30%, a thermoplastic elastomer capable of providing a molded article having good appearance can be obtained.

The block copolymer (D) used in the invention may be formed from the block (c) and the block (d), or may be formed from the block (c) and the butadiene polymer block (e).

In the block copolymer (D), the polymer block of styrene or its derivative (c) is contained in an amount of preferably 5 to 50% by weight, more preferably 10 to 45% by weight; and the isoprene polymer block or isoprene/butadiene copolymer block (d) or the butadiene polymer block (e) is contained in an amount of preferably 95 to 50% by weight, more preferably 90 to 55% by weight.

In the present invention, the block copolymer (D) is preferably hydrogenated. If the hydrogenated block copolymer is used as the block copolymer (D), a thermoplastic elastomer capable of providing a molded article excellent in scratch resistance and heat resistance can be obtained.

The block copolymer (D) used in the present invention has a melt flow rate (MFR, measured in accordance with ASTM D 1238 at 230° C. under a load of 2.16 kg, ) of preferably 0.01 to 100 g/10 min, more preferably 0.01 to 50 g/10 min. If the block copolymer (D) having such a melt flow rate as defined above is used, a thermoplastic elastomer capable of providing a molded article excellent in scratch resistance can be obtained.

As the block form of the block copolymer (D) used for the invention, a form of block (c)—block (d) or (e)—block (c) is most preferred, but the block form is in no way limited thereto.

The block copolymer (D) which may be hydrogenated can be prepared, for example, in the same manner as described above to prepare the block copolymer (B).

In the preparation of the hydrogenated block copolymer, the block to be hydrogenated is the isoprene polymer block or isoprene/butadiene copolymer block (d) or the butadiene polymer block (e).

In the first olefin thermoplastic elastomer of the invention, the block copolymer (D) is used in an amount of 1 to 40 parts by weight, preferably 3 to 35 parts by weight, more preferably 5 to 30 parts by weight, based on parts by weight of the total amount of the crystalline polyolefin resin (A), the block copolymer (B) and the olefin rubber (C).

If the block copolymer (D) is used in such an amount as defined above, a thermoplastic elastomer capable of providing a molded article excellent in scratch resistance and appearance can be obtained.

Softening Agent (E)

The first olefin thermoplastic elastomer of the invention which is partially crosslinked may further contain, as its component, a softening agent (E), if necessary.

Suitable as the softening agent (E) are those conventionally used for rubbers.

Examples of the softening agent (E) include:

petroleum products such as process oil, lubricant, paraffin, liquid paraffin, petroleum asphalt and vaseline;

coal tars such as coal tar and coal tar pitch;

fatty oils such as castor oil, linseed oil, rapeseed oil, soybean oil and coconut oil;

waxes such as tall oil, beeswax, carnauba wax and lanolin;

fatty acids such as ricinolic acid, palmitic acid and stearic acid, and metallic salts thereof;

synthetic polymers such as petroleum resin, coumarone-indene resin and atactic polypropylene;

ester plasticizers such as dioctyl phthalate, dioctyl adipate and dioctyl sebacate; and others such as microcrystalline wax, liquid polybutadiene or its modified or hydrogenated products, and liquid thiokol.

Filler (F)

The first olefin thermoplasic elastomer of the invention which is partially crosslinked may further contain, as its component, a filler (F), if necessary.

Suitable as the filler (F) are those conventionally used for rubbers.

Examples of the filler (F) include calcium carbonate, calcium silicate, clay, kaolin, talc, silica, diatomaceous earth, mica powder, asbestos, barium sulfate, aluminum sulfate, calcium sulfate, magnesium carbonate, molybdenum disfulfide, glass fiber, glass bead, shirasu balloon, graphite and alumina.

In the first olefin thermoplastic elastomer of the invention, the softening agent (E) and the filler (F) are used respectively in an amount of 0 to 40% by weight, preferably 3 to 35% by weight, more preferably 5 to 30% by weight, based on 100% by weight of the total amount of the crystalline polyolefin resin (A), the block copolymer (B), the olefin rubber (C), the softening agent (E) and the filler (F), provided that the total amount of the crystalline polyolefin resin (A), the block copolymer (B) and the olefin rubber (C) is 40 to 100% by weight.

If the softening agent (E) is used in an amount of 1 to 40% by weight, a thermoplastic elastomer having good flowability in the molding process can be obtained. A molded article produced from this thermoplastic elastomer is excellent in scratch resistance.

The olefin thermoplastic elastomer may further contain additives such as known heat stabilizers, anti-aging agents, weathering stabilizers, antistatic agents and lubricants (e.g., metallic soap, waxes), with the proviso that the objects of the invention are not marred.

Examples of the known heat stabilizers, anti-aging agent and weathering stabilizers include those of phenols, sulfites, phenylalkanes, phosphites and amines.

The first olefin thermoplastic elastomer of the invention has a composition containing at least the crystalline polyolefin resin (A), the block copolymer (B) and the olefin rubber (C), as mentioned above, and is partially crosslinked.

The expression "partially crosslinked" means that the gel content (weight of cyclohexane-insoluble portion) as measured by the following method is for example not less than 10%, particularly not less than 20% and less than 98%. In the invention, the gel content is preferably not less than 30%. When the gel content is in the above range, the resulting thermoplastic elastomer has a good flowability in the molding process and can provide a molded article excellent in mechanical strength and heat resistance.

[Method of measuring a gel content (weight of cyclohexane-insoluble portion)]

About 100 mg of a thermoplastic elastomer is cut to give a test sample of 0.5 mm×0.5 mm×0.5 mm, and the resulting sample is immersed in 30 ml of cyclohexane at 23° C. for 48 hours.

Then, the sample was placed on a filter paper and dried at room temperature for 72 hours until the weight of the sample becomes constant.

A value obtained by subtracting the weight of the cyclohexane-insoluble components (fibrous filler, filler, pigment, etc.) other than the polymer component from the weight of the dried sample is taken as "corrected final weight (Y)".

On the other hand, a value obtained by subtracting the weight of the cyclohexane-soluble components (e.g., softening agent) other than the polymer component and the weight of the cyclohexane-insoluble components (fibrous filler, filler, pigment, etc.) other than the polymer component from the weight of the sample is taken as "corrected initial weight (X)".

The gel content (weight of cyclohexane-insoluble portion) is calculated by the following formula:

$$\text{Gel content [\% by weight]} = [\text{corrected final weight } (Y)] \div [\text{corrected initial weight } (Y)] \times 100$$

In the first olefin thermoplastic elastomer of the invention, a crystalline polyolefin resin may be added in a specific amount to the above-mentioned partially crosslinked thermoplastic elastomer.

As the crystalline polyolefin resin, the aforesaid crystalline polyolefin resin (A) is preferably used.

In the first olefin thermoplastic elastomer of the invention, this crystalline polyolefin resin is used in an amount of preferably 5 to 50 parts by weight, more preferably 5 to 40 parts by weight, based on 100 parts by weight of the above-mentioned partially crosslinked.

If the crystalline polyolefin resin is used in such an amount as defined above, a thermoplastic elastomer having high moldability and capable of providing a molded article excellent in fabricability, flexibility and scratch resistance can be obtained.

Next, the process for preparing the first olefin thermoplastic elastomer of the invention is described.

Of the first olefin thermoplastic elastomers of the invention, the thermoplastic elastomer comprising the crystalline polyolefin resin (A), the block copolymer (B) and the olefin rubber (C) and optionally at least one element selected from the group consisting of the block copolymer (D), the softening agent (E), the filler (F) and other additives as mentioned above are prepared in the following manner.

The thermoplastic elastomers of the invention as mentioned above can be obtained by dynamically heat-treating a blend which is obtained by blending the crystalline polyolefin resin (A), the block copolymer (B), the olefin rubber (C) and optionally at least one element selected from the group consisting of the block copolymer (D), the softening agent (E), the filler (F) and other additives as mentioned above, in the presence of an organic peroxide so as to be partially crosslinked.

The expression "dynamically heat-treating" means kneading in a molten state.

Examples of the organic peroxides used in the invention include dicumyl peroxide, di-tert-butyl peroxide, 2,5-dimethyl-2,5-di-(tert-butylperoxy)hexane, 2,5-dimethyl2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tertbutylperoxy)valerate, benzoyl peroxide, p-chlorobenzoyl peroxide, 2,4-dichlorobenzoyl peroxide, tert-butyl peroxybenzoate, tert-butyl perbenzoate, tert-butylperoxyisoproyl carbonate, diacetyl peroxide, lauroyl peroxide and tert-butylcumyl peroxide.

Of these, preferred are 2,5-dimethyl-2, 5-di-(tertbutylperoxy)hexane, 2,5-dimethyl-2,5-di-(tertbutylperoxy)hexyne-3, 1,3-bis(tertbutylperoxyisopropyl)benzene, 1,1-bis-(tert-butylperoxy)-3,3,5-trimethylcyclohexane and n-butyl-4,4-bis (tertbutylperoxy)valerate, and most preferred is 1,3-bis(tertbutylperoxyisopropyl)benzene, from the viewpoints of odor and scorch stability.

In the first olefin thermoplastic elastomer, the organic peroxide is used in an amount of 0.05 to 3% by weight, preferably 0.1 to 1% by weight, based on 100% by weight of the total amount of the crystalline polyolefin resin (A) and the olefin rubber (C).

In the partial crosslinking treatment with the organic peroxide in the invention, there can be used peroxy crosslinking aids such as sulfur, p-quinonedioxime, p,p'-dibenzoylquinonedioxime, N-methyl-N-4-dinitrosoaniline, nitrosobenzene, diphenylguanidine and trimethylolpropane-N,N'-m-phenylenedimaleimide; divinylbenzene, triallyl cyanurate; polyfunctional methacrylate monomers such as ethylene glycol dimethacrylate, diethylene glycol dimethacrylate, polyethylene glycol dimethacrylate, trimethylolpropane trimethacrylate and allyl methacrylate; and polyfunctional vinyl monomers such as vinyl butyrate and vinyl stearate.

By the use of the above compounds, a uniform and mild crosslinking reaction can be expected. In the invention, divinylbenzene is more preferred. Divinylbenzene is easy in handling and excellent in mutual solvility with the crystalline polyolefin resin (A), the olefin rubber (C) and other rubbers than the olefin rubber (C), which are major components to be crosslinked. Further, divinylbenzene has an action of solubilizing the organic peroxide and serves as a dispersant of the organic peroxide. Hence, by the use thereof, a thermoplastic elastomer exerting uniform crosslinking effect by the heat treatment and having a good balance between flowability and physical properties can be obtained.

In the first olefin thermoplastic elastomer, the crosslinking aid or the polyfunctional vinyl monomer is used in an amount of preferably 0.1 to 2% by weight, particularly preferably 0.3 to 1% by weight, based on the total weight of the materials to be crosslinked. If the amount of the crosslinking aid or the polyfunctional vinyl monomer is in the above range, the crosslinking aid or the polyfunctional vinyl monomer never remains as the unreacted monomer in the resulting thermoplastic elastomer, and therefore the obtained thermoplastic elastomer does not suffer any change in physical properties caused by heat in the molding process and has a high flowability.

The dynamic heat treatment is carried out using a mixing roll, an intensive mixer, a kneading apparatus (e.g., Banbury mixer, kneader, single-screw extruder, a twin-screw extruder), etc., but it is preferably carried out using a non-open type kneading apparatus. The dynamic heat treatment is preferably performed in an inert gas atmosphere such as nitrogen. The temperature for the heat treatment is in the range of usually the melting point of a polyolefin resin to 300° C. and the kneading time is preferably in the range of 1 to 10 minutes. The shear force applied in the kneading is preferably in the range of 100 to 50,000 $sec^{-1}$ in terms of shear rate.

The first olefin thermoplastic elastomer of the invention includes the partially crosslinked thermoplastic elastomer obtained by the process as mentioned above.

The first olefin thermoplastic elastomer of the invention further includes a thermoplastic elastomer consisting of this partially crosslinked thermoplastic elastomer and a crystalline polyolefin.

Moreover, the first olefin thermoplastic elastomer of the invention also includes a thermoplastic elastomer obtained by mixing the partially crosslinked thermoplastic elastomer comprising the crystalline polyolefin resin (A), the block copolymer (B) and the olefin rubber (C) with the block copolymer (D).

These thermoplastic elastomers are desirably prepared by subjecting 100 parts by weight of the partially crosslinked thermoplastic elastomer and 5 to 50 parts by weight of the crystalline polyolefin resin or 5 to 50 parts by weight of the block copolymer (D) to the above-mentioned dynamic heat treatment. In this case, however, the dynamic heat treatment is carried out in the absence of an organic peroxide.

Next, the second olefin thermoplastic elastomer according to the invention is described.

The second olefin thermoplastic elastomer according to the invention comprises an olefin thermoplastic elastomer which is partially crosslinked and comprises:

[I] the crystalline polyolefin resin (A),

[II] the block copolymer (B), and

[III] at least one element selected from the group consisting of (a) silicone oil, (b) an ester of aliphatic alcohol and a dicarboxylic acid or a fatty acid and (c) a fluorine polymer in the specific amounts.

The second olefin thermoplastic elastomer of the invention may further contain at least one element selected from the group consisting of the block copolymer (D), the olefin rubber (C), the softening agent (E) and the filler (F), if necessary, in addition to the the crystalline polyolefin resin (A), the block copolymer (B), and at least one element selected from the group consisting of the silicone oil (a), the ester (b) and the fluorine polymer (c).

In the second olefin thermoplastic elastomer of the invention, the crystalline polyolefin resin (A) is used in an amount of 20 to 85 parts by weight, preferably 30 to 75 parts by weight, more preferably 35 to 70 parts by weight, based on 100 parts by weight of the total amount of the crystalline polyolefin resin (A) and the block copolymer (B).

If the crystalline polyolefin resin (A) is used in such an amount as defined above, a thermoplastic elastomer having good moldability and capable of providing a molded article excellent in scratch resistance and heat resistance can be obtained.

In the second olefin thermoplastic elastomer of the invention, the block copolymer (B) is used in an amount of 15 to 80 parts by weight, preferably 25 to 70 parts by weight, more preferably 30 to 65 parts by weight, based on 100 parts by weight of the total amount of the crystalline polyolefin resin (A) and the block copolymer (B).

If the block copolymer (B) is used in such an amount as defined above, a thermoplastic elastomer capable of providing a molded article excellent in scratch resistance and heat resistance can be obtained.

In the second olefin thermoplastic elastomer of the invention, the block copolymer (D) may be used in an amount of 0 to 50 parts by weight, preferably 0 to 40 parts by weight, more preferably 0 to 30 parts by weight, based on 100 parts by weight of the total amount of the crystalline polyolefin resin (A) and the block copolymer (B) .

If the block copolymer (D) is used in such an amount as defined above, a thermoplastic elastomer capable of providing a molded article excellent in scratch resistance and appearance can be obtained.

In the second olefin thermoplastic elastomer of the invention, the olefin rubber (C) is used in an amount of 0 to 50 parts by weight, preferably 0 to 40 parts by weight, more preferably 0 to 30 parts by weight, based on 100 parts by weight of the total amount of the crystalline polyolefin resin (A) and the block copolymer (B).

If the olefin rubber (C) is used in such an amount as defined above, a thermoplastic elastomer capable of providing a molded article excellent in scratch resistance and flexibility can be obtained.

In the second olefin thermoplastic elastomer of the invention, the softening agent (E) and the filler (F) are used respectively in an amount of 0 to 40% by weight, preferably 1 to 30% by weight, based on 100% by weight of the total amount of the crystalline polyolefin resin (A), the block copolymer (B), the softening agent (E) and the filler (F), provided that the total amount of the crystalline polyolefin resin (A) and the block copolymer (B) is 40 to 100% by weight.

If the softening agent (E) is used in an amount of 1 to 40% by weight, a thermoplastic elastomer having good flowability in the molding process can be obtained. A molded article produced from this thermoplastic elastomer is excellent in scratch resistance.

In the second olefin thermoplastic elastomer of the invention, as described above, at least one element selected from the group consisting of (a) silicone oil, (b) an ester of aliphatic alcohol and a dicarboxylic acid or a fatty acid and (c) a fluorine polymer is used.

Examples of the silicone oil (a) used in the invention include dimethyl silicone oil, phenylmethyl silicone oil, fluorosilicone oil, tetremethyltetraphenyl trisiloxane and modified silicone oil. Of these, preferably used are dimethyl silicone oil and phenylmethyl silicone oil.

The silicone oil (a) has a kinematic viscosity [JIS K2283: 25° C.] of 10 to 30,000 cSt, preferably 50 to 10,000 cSt, more preferably 100 to 5,000 cSt.

Examples of the ester of aliphatic alcohol and a dicarboxylic acid or a fatty acid (b) used in the invention include ester of cetyl alcohol and acetic acid, propionic acid or butyric acid, ester of tallow alcohol and acetic acid, propionic acid or butyric acid, ester of steary alcohol and acetic acid, propionic acid or butyric acid, ester of distearyl alcohol and phthalic acid, glycerol mono-oleate, glycerol monostearate, 12-hydroxyl stearate, glycerol tristearate, trimethylolpropane tristearate, pentaerythritol tetrastearate, butyl stearate, isobutyl stearate, stearic ester, oleic ester, behenic ester, calcium soap-containing ester, isotridecyl stearate, cetyl palmitate, cetyl stearate, stearyl stearate, behenyl behenate, ethylene glycol montanate, glycerol montanate, pentaerythritol montanate and calcium-containing montanic ester. Of these, preferred are ester of distearyl alcohol and phthalic acid, glycerol mono-oleate, glycerol monostearate, stearic ester and glycerol montanate. Particularly preferred are ester of distearyl alcohol and phthalic acid, glycerol mono-oteate and glycerol montanate.

Examples of the fluorine polymer (c) used in the invention include polytetrafluoroethylene and vinylidene fluoride copolymers. Of these, polytetrafluoroethylene is preferred.

In the second olefin thermoplastic elastomer of the invention, the silicone oil (a), the ester (b) or the fluorine polymer (c) is used in an amount of 0.01 to 10 parts by weight, preferably 0.01 to 5 parts by weight, based on 100 parts by weight of the total amount of the crystalline polyolefin resin (A) and the block copolymer (B).

If the silicone oil (a), the ester (b) or the fluorine polymer (c) is used in such an amount as defined above, a thermoplastic elastomer excellent in scratch resistance owing to the surface improving effect can be obtained.

The second olefin thermoplastic elastomer may further contain the at least one of additives such as heat stabilizers, anti-aging agents, weathering stabilizers, antistatic agents and lubricants (e.g., metallic soap, waxes), with the proviso that the objects of the invention are not marred.

The second olefin thermoplastic elastomer can be prepared by blending the crystalline polyolefin resin (A), the block copolymer (B) and at least one element selected from the group consisting of the silicone oil (a), the ester (b) and the fluorine polymer (c), and if necessary, at least one element selected from the group consisting of the olefin rubber (C), the softening agent (E), the filler (F) and other additives as mentioned above, followed by the aforementioned dynamic heat treatment in the presence of the organic peroxide.

In the second olefin thermoplastic elastomer of the invention, the organic peroxide is used in an amount of 0.05 to 3% by weight, preferably 0.1 to 1% by weight, based on 100% by weight of the total amount of the crystalline polyolefin resin and the olefin rubber.

Depending on the use of a thermoplastic elastomer, a thermoplastic elastomer comprising the same component with those of the second olefin thermoplastic elastomer but not crosslinked can be applied to the use.

Further, it is desired that the aforesaid crosslinking aids and polyfunctional vinyl monomers are used in combination.

The kneading is preferably carried out at the temperature at which a half-life period of the organic peroxide corresponds to less than 1 minute. The kneading temperature is in the range of usually 150° to 280° C., preferably 170° to 240° C., and the kneading time is in the range of 1 to 20 minutes, preferably 1 to 5 minutes. The shear force applied in the kneading is in the range of usually 10 to $10^4$ $sec^{-1}$ preferably $10^2$ to $10^4$ $sec^{-1}$ in terms of shear rate.

The expression "partially crosslinked" means that the gel content (weight of cyclohexane-insoluble portion) as measured by the aforesaid method is for example not less than 10% particularly not less than 20% and less than 98%. In the invention, the gel content is preferably not less than 30%.

When the gel content is in the above range, the resulting thermoplastic elastomer has good flowability in the molding process and can provide a molded article excellent in mechanical strength and heat resistance.

Next, the third olefin thermoplastic elastomer according to the invention is described.

The third olefin thermoplastic elastomer of the invention comprises a thermoplastic elastomer [1] and the abovementioned block copolymer (B) in the specific amounts.

In the third olefin thermoplastic elastomer of the invention, the crystalline polyolefin resin (A), the olefin rubber (C), the block copolymer (D) and the softening agent (E) may be also contained in the specific amounts, if necessary.

The thermoplastic elastomer [1] used in this invention is composed of the crystalline polyolefin resin (A) and the olefin rubber (C).

In the third olefin thermoplastic elastomer of the invention, the crystalline polyolefin resin (A) is used in an amount of 10 to 90 parts by weight, preferably 10 to 80 parts by weight, more preferably 20 to 70 parts by weight, based on 100 parts by weight of the total amount of the crystalline polyolefin resin (A) and the olefin rubber (C).

If the crystalline polyolefin resin (A) is used in such an amount as defined above, a thermoplastic elastomer having good moldability and capable of providing a molded article excellent in scratch resistance and heat resistance can be obtained.

In the thermoplastic elastomer [1], the olefin rubber (C) is present in the state of being partially cross linked or in the state of being perfectly crosslinked. In this invention, the olefin rubber (C) is present preferably in the state of being partially crosslinked.

In this invention, the olefin rubber (C) may be used in combination with other rubbers than the olefin rubber (C) which are described before, with the proviso that the objects of the invention are not marred.

In the third olefin thermoplastic elastomer of the invention, the olefin rubber (C) is used in an amount of 10 to 90 parts by weight, preferably 20 to 90 parts by weight, more preferably 30 to 80 parts by weight, based on 100 parts by weight of the total amount of the crystalline polyolefin resin (A) and the olefin rubber (C).

When the olefin rubber (C) and other rubber than the olefin rubber (C) are used in combination, the rubber other than the olefin rubber (C) is used in an amount of not more than 40 parts by weight, preferably 5 to 20 parts by weight, based on 100 parts by weight of the total amount of the crystalline polyolefin resin (A) and the olefin rubber (C).

If the olefin rubber (C) or a combination of the olefin rubber (C) and the rubber other than the olefin rubber (C) is used in such an amount as defined above, a thermoplastic elastomer capable of providing a molded article excellent in scratch resistance and flexibility can be obtained.

The thermoplastic elastomer [1] used in this invention may further contain additives such as softening agents of mineal oil, heat stabilizers, antistatic agents, weathering stabilizers, anti-aging agents, fillers, colorants and lubricants, if necessary, with the proviso that the objects of the invention are not marred.

The thermoplastic elastomer [1] used in this invention comprises preferably a crystalline polypropylene resin and an ethylene/α-olefin copolymer rubber or an ethylene/α-olefin/non-conjugated diene copolymer rubber. In the thermoplastic elastomer [1], these components are present in the partially crosslinked state, and the weight ratio between the crystalline polypropylene resin and the olefin rubber is in the range of 70/30 to 10/90 (crystalline polypropylene resin/olefin rubber).

An example of the thermoplastic elastomer [1] preferably used in the invention is a thermoplastic elastomer which comprises:

a crystalline polypropylene resin in an amount of 60 to 10 parts by weight, an ethylene/propylene copolymer rubber or an ethylene/propylene/diene copolymer rubber as the olefin rubber in an amount of 40 to 90 parts by weight, the total amount of said crystalline polypropylene resin and said olefin rubber being 100 parts by weight, and a rubber other than the olefin rubber in an amount of 5 to 100 parts by weight and/or a softening agent of mineral oil in an amount of 5 to 100 parts by weight, wherein the olefin rubber is partially crosslinked.

The thermoplastic elastomer [1] used in the invention can be prepared by dynamically heat-treating a blend of the crystalline polyolefin resin (A) and the olefin rubber (C) in the presence of the aforementioned organic peroxide.

The dynamic heat treatment is desirably carried out under the same conditions as described before with respect to the second olefin thermoplastic elastomer.

The expression "partially crosslinked" means that the gel content (weight of cyclohexane-insoluble portion) as measured by the aforesaid method is for example not less than 10% particularly not less than 20% and less than 98%. In the invention, the gel content is preferably not less than 30%. The expression "perfectly crosslinked" means that the gel content (weight of cyclohexane-insoluble portion) as measured by the aforesaid method is in the rage of 98 to 100%. If the thermoplastic elastomer [1] having a gel content in the above range is used, the resulting thermoplastic elastomer has good flowability in the molding process and can provide a molded article excellent in mechanical strength and heat resistance.

In the third olefin thermoplastic elastomer of the invention, the thermoplastic elastomer [1] is used in an amount of 10 to 80 parts by weight, preferably 20 to 70 parts by weight, more preferably 30 to 70 parts by weight, based on 100 parts by weight of the total amount of the thermoplastic elastomer [1] and the block copolymer (B).

If the thermoplastic elastomer [1] is used in such an amount as defined above, a thermoplastic elastomer capable of providing a molded article excellent in scratch resistance and heat resistance can be obtained.

In this invention, the block copolymer (B) is used in an amount of 20 to 90 parts by weight, preferably 30 to 80 parts by weight, more preferably 30 to 70 parts by weight, based on 100 parts by weight of the total amount of the thermoplastic elastomer [1] and the block copolymer (B).

If the block copolymer (B) is used in such an amount as defined above, a thermoplastic elastomer capable of providing a molded article excellent in scratch resistance and heat resistance can be obtained.

The third olefin thermoplastic elastomer of the invention may further contain the crystalline polyolefin resin (A), if necessary, in addition to the thermoplastic elastomer [1] and the block copolymer (B).

In the third olefin thermoplastic elastomer of the invention, the crystalline polyolefin resin (A) is used in an amount of preferably 5 to 100 parts by weight, more preferably 5 to 70 parts by weight, based on 100 parts by weight of the total amount of the thermoplastic elastomer [1] and the block copolymer (B).

If the crystalline polyolefin resin (A) is used in such an amount as defined above, a thermoplastic elastomer having high moldability and capable of providing a molded article excellent in fabricability, flexibility and scratch resistance can be obtained.

The third olefin thermoplastic elastomer of the invention may further contain the olefin rubber (C), if necessary.

In place of the olefin rubber (C), other rubber than the olefin rubber (C) can be used. Further, the olefin rubber (C) and other rubber than the olefin rubber (C) can be used in combination.

In the third olefin thermoplastic elastomer of the invention, the olefin rubber (C) is used in an amount of preferably 5 to 100 parts by weight, more preferably 5 to 70 parts by weight, based on 100 parts by weight of the total amount of the thermoplastic elastomer [1] and the block copolymer (B).

The rubber other than the olefin rubber (C) is used in an amount of preferably 5 to 100 parts by weight, more preferably 5 to 70 parts by weight, based on 100 parts by weight of the total amount of the thermoplastic elastomer [1] and the block copolymer (B).

When the olefin rubber (C) and other rubber than the olefin rubber (C) are used in combination, the rubber other than the olefin rubber (C) is used in an amount of preferably 5 to 70 parts by weight, more preferably 5 to 50 parts by weight, based on 100 parts by weight of the total amount of the thermoplastic elastomer [1] and the block copolymer (B).

If the olefin rubber (C) and/or other rubber than the olefin rubber (C) is used in such an amount as defined above, a thermoplastic elastomer capable of providing a molded article excellent in flexibility and scratch resistance can be obtained.

The third olefin thermoplastic elastomer of the invention may further contain the block copolymer (D), if necessary.

In the third olefin thermoplastic elastomer of the invention, the block copolymer (D) is used in an amount of preferably 0 to 30 parts by weight, more preferably 0 to 20 parts by weight, based on 100 parts by weight of the total amount of the thermoplastic elastomer [1] and the block copolymer (B).

If the block copolymer (D) is used in such an amount as defined above, a thermoplastic elastomer capable of providing a molded article excellent in scratch resistance and appearance can be obtained.

The third olefin thermoplastic elastomer of the invention may further contain the softening agent (E) and/or the filler (F), if necessary.

In the third olefin thermoplastic elastomer of the invention, the softening agent (E) and the filler (F) are used in an amount of 0 to 40% by weight, preferably 1 to 30% by weight, based on 100% by weight of the total amount of the thermoplastic elastomer [1], the block copolymer (B), the softening agent (E) and the filler (F), provided that the total amount of the thermoplastic elastomer [I] and the block copolymer (B) is 40 to 100% by weight.

If the softening agent (E) is used in such an amount of 1 to 40% by weight, a thermoplastic elastomer having good flowability in the molding process can be obtained. A molded article produced from this thermoplastic elastomer is excellent in scratch resistance.

The third olefin thermoplastic elastomer may further contain the aforementioned additives such as heat stabilizers, anti-aging agents, weathering stabilizers, antistatic agents and lubricants (e.g., metallic soap, waxes), if necessary, with the proviso that the objects of the invention are not marred.

For mixing the thermoplastic elastomer [1], the block copolymer (B), the crystalline polyolefin resin (A), the olefin rubber (C), the softening agent (E) and the filler (F) (components (A), (C), (E) and (F) being optionally used if necessary), the same dynamic heat treatment as described above in the preparation of the thermoplastic elastomer [1] is preferably carried out. In this case, however, the dynamic heat treatment is conducted in the absence of an organic peroxide.

Next, the fourth olefin thermoplastic elastomer according to the invention is described.

The fourth olefin thermoplastic elastomer of the invention is an olefin thermoplastic elastomer comprising:

[I] the partially or perfectly crosslinked thermoplastic elastomer [1],

[II] the block copolymer (B), and

[III] at least one element selected from the group consisting of the silicone oil (a), the ester of aliphatic alcohol and a carboxylic acid or a fatty acid (b) and the fluorine polymer (c), wherein the above components are contained in the specific amounts.

The fourth olefin thermoplastic elastomer of the invention may further contain at least one element selected from the group consisting of the crystalline polyolefin resin (A), the block copolymer (D), the olefin rubber (C), the softening agent (E) and the filler (F), if necessary, in addition to the thermoplastic elastomer [1], the block copolymer (B), the silicone oil (a), the ester (b) and the fluorine polymer (c).

In the fourth olefin thermoplastic elastomer of the invention, the thermoplastic elastomer [1] is used in an amount of 10 to 80 parts by weight, preferably 30 to 80 parts by weight, more preferably 35 to 75 parts by weight, based on 100 parts by weight of the total amount of the thermoplastic elastomer [1] and the block copolymer (B).

If the thermoplastic elastomer [1] is used in such an amount as defined above, a thermoplastic elastomer capable of providing a molded article excellent in scratch resistance and heat resistance can be obtained.

In the fourth olefin thermoplastic elastomer of the invention, the block copolymer (B) is used in an amount of 20 to 90 parts by weight, preferably 20 to 70 parts by weight, more preferably 25 to 65 parts by weight, based on 100 parts by weight of the total amount of the thermoplastic elastomer [1] and the block copolymer (B).

If the block copolymer (B) is used in such an amount as defined above, a thermoplastic elastomer capable of providing a molded article excellent in scratch resistance and heat resistance can be obtained.

In the fourth olefin thermoplastic elastomer of the invention, the silicone oil (a), the ester (b) or the fluorine polymer (c) is used in an amount of 0.01 to 10 parts by weight, preferably 0.01 to 5 parts by weight, based on 100 parts by weight of the total amount of the thermoplastic elastomer [1] and the block copolymer.

If the silicone oil (a), the ester (b) or the fluorine polymer (c) is used in such an amount as defined above, a thermoplastic elastomer excellent in scratch resistance owing to the surface improving effect can be obtained.

In the fourth olefin thermoplastic elastomer of the invention, the crystalline polyolefin resin (A) is used in an amount of 0 to 50 parts by weight, preferably 0 to 40 parts by weight, more preferably 0 to 30 parts by weight, based on 100 parts by weight of the total amount of the thermoplastic elastomer [1] and the block copolymer (B).

If the crystalline polyolefin resin (A) is used in such an amount as defined above, a thermoplastic elastomer having good moldability and capable of providing a molded article excellent in scratch resistance and heat resistance can be obtained.

In the fourth olefin thermoplastic elastomer of the invention, the block copolymer (D) is used in an amount of 0 to 50 parts by weight, preferably 0 to 40 parts by weight, more preferably 0 to 30 parts by weight, based on 100 parts by weight of the total amount of the thermoplastic elastomer [1] and the block copolymer (B).

If the block copolymer (D) is used in such an amount as defined above, a thermoplastic elastomer capable of providing a molded article excellent in scratch resistance and appearance can be obtained.

In the fourth olefin thermoplastic elastomer of the invention, the olefin rubber (C) is used in an amount of 0 to 50 parts by weight, preferably 0 to 40 parts by weight, more preferably 0 to 30 parts by weight, based on 100 parts by weight of the total amount of the thermoplastic elastomer [1] and the block copolymer (B).

If the olefin rubber (C) is used in such an amount as defined above, a thermoplastic elastomer capable of providing a molded article excellent in scratch resistance and flexibility can be obtained.

In the fourth olefin thermoplastic elastomer of the invention, the softening agent (E) and the filler (F) are used respectively in an amount of 0 to 40% by weight, preferably 1 to 30% by weight, based on 100% by weight of the total amount of the thermoplastic elastomer [1], the block copolymer (B), the softening agent (E) and the filler (F).

If the softening agent (E) is used in an amount of 1 to 40% by weight, a thermoplastic elastomer having good flowability in the molding process can be obtained. A molded article produced from this thermoplastic elastomer is excellent in scratch resistance.

The fourth olefin thermoplastic elastomer can be prepared by blending the thermoplastic elastomer [1], the block copolymer (B) and at least one element selected from the group consisting of the silicone oil (a), the ester (b) and the fluorine polymer (c), and if necessary, at least one element selected from the group consisting of the crystalline polyolefin resin (A), the block copolymer (D), the olefin rubber (C), the softening agent (E), the filler (F) and other additives as mentioned above, followed by dynamic heat treatment in the presence of the organic peroxide.

As the dynamic heat treatment performed in the preparation of the fourth olefin thermoplastic elastomer, the same dynamic heat treatment as described in the preparation of the thermoplastic elastomer [1] is desirably used.

Next, the first thermoplastic elastomer laminate according to the invention is described.

The first thermoplastic elastomer laminate of the invention comprises a substrate and a skin layer.

The substrate is formed from an olefin thermoplastic elastomer [2] which comprises the crystalline polyolefin resin (A) and the olefin rubber (C) and is partially or perfectly crosslinked.

The thermoplastic elastomer [2] is identical with the aforesaid thermoplastic elastomer [1].

In the thermoplastic elastomer [2], however, the crystalline polyolefin resin (A) is used in an amount of usually 10 to 90 parts by weight, preferably 10 to 70 parts by weight, more preferably 20 to 60 parts by weight, based on 100 parts by weight of the total amount of the crystalline polyolefin resin (A) and the olefin rubber (C).

The olefin rubber (C) is used in an amount of usually 10 to 90 parts by weight, preferably 30 to 90 parts by weight, more preferably 40 to 80 parts by weight, based on 100 parts by weight of the total amount of the crystalline polyolefin resin (A) and the olefin rubber (C).

When the olefin rubber (C) and other rubber than the olefin rubber (C) are used in combination, the rubber other than the olefin rubber (C) is used in an amount of not more than 40 parts by weight, preferably 5 to 20 parts by weight, based on 100 parts by weight of the total amount of the crystalline polyolefin resin (A) and the olefin rubber (C).

If the olefin rubber (C) or a combination of the olefin rubber (C) and other rubber than the olefin rubber (C) is used in such an amount as defined above, a thermoplastic elastomer capable of providing a substrate excellent in flexibility can be obtained.

The thermoplastic elastomer [2] used in this invention may further contain additives such as softening agents of mineral oil, heat stabilizers, antistatic agents, weathering stabilizers, anti-aging agents, fillers, colorants and lubricants, if necessary, with the proviso that the objects of the invention are not marred.

The thermoplastic elastomer [2] used in this invention comprises preferably a crystalline polypropylene resin and an ethylene/α-olefin copolymer rubber or an ethylene/α-olefin/non-conjugated diene copolymer rubber. In the thermoplastic elastomer [2], these components are present in the partially crosslinked state, and the weight ratio between the crystalline polypropylene resin and the olefin rubber is in the range of 70/30 to 10/90 (crystalline polypropylene resin/olefin rubber).

An example of the thermoplastic elastomer [2] preferably used in the invention is a thermoplastic elastomer which comprises:

a crystalline polypropylene resin in an amount of 70 to 10 parts by weight, an ethylene/propylene copolymer rubber or an ethylene/propylene/diene copolymer rubber as the olefin rubber in an amount of 30 to 90 parts by weight, the total amount of said crystalline polypropylene resin and said olefin rubber being 100 parts by weight, and other rubber than the olefin rubber in an amount of 5 to 100 parts by weight and/or a softening agent of mineral oil in an amount of 5 to 100 parts by weight, wherein the olefin rubber is partially crosslinked.

Such thermoplastic elastomer [2] has good flowability in the molding process and can provide a substrate excellent in mechanical strength and heat resistance.

The thermoplastic elastomer [2] can be prepared by the same process as for preparing the thermoplastic elastomer [1].

The thermoplastic elastomer used for forming the skin layer includes an olefin thermoplastic elastomer [3] comprising the crystalline polyolefin resin (A) and the block copolymer (B) in the specific amounts and an olefin thermoplastic elastomer [4] comprising the crystalline polyolefin resin (A), the block copolymer (B) and the block copolymer (D) in the specific amounts. In this invention, the thermoplastic elastomer [4] may further contain the olefin rubber (C), the softening agent (E) and the filler (F), if necessary.

In the thermoplastic elastomer [3], the crystalline polyolefin resin (A) is used in an amount of usually 20 to 85 parts by weight, preferably 30 to 75 parts by weight, more preferably 40 to 60 parts by weight, based on 100 parts by weight of the total amount of the crystalline polyolefin resin (A) and the block copolymer (B).

In the thermoplastic elastomer [4], the crystalline polyolefin resin (A) is used in an amount of usually 20 to 85 parts by weight, preferably 20 to 75 parts by weight, more preferably 20 to 60 parts by weight, based on 100 parts by weight of the total amount of the crystalline polyolefin resin (A), the block copolymer (B), the block copolymer (D), the olefin rubber (C) and the softening agent (E). However, the olefin rubber (C) and the softening agent (E), the filler (F) and other additives as mentioned above are used, if necessary, so that each amount thereof might be 0 part by weight.

In the thermoplastic elastomer [3], the block copolymer (B) is used in an amount of usually 15 to 80 parts by weight, preferably 25 to 70 parts by weight, more preferably 40 to 60 parts by weight, based on 100 parts by weight of the total amount of the crystalline polyolefin resin (A) and the block copolymer (B).

In the thermoplastic elastomer [4], the block copolymer (B) is used in an amount of usually 12 to 79 parts by weight, preferably 20 to 70 parts by weight, more preferably 20 to 60 parts by weight, based on 100 parts by weight of the total amount of the crystalline polyolefin resin (A), the block copolymer (B), the block copolymer (D), the olefin rubber (C), the softening agent (E) and the filler (F). However, the olefin rubber (C), the softening agent (E) and the filler (F) are used if necessary as described above, so that each amount thereof might be 0 part by weight.

If the block copolymer (B) is used in such an amount as defined above, a thermoplastic elastomer capable of providing a skin layer excellent in heat resistance and scratch resistance can be obtained.

In the thermoplastic elastomer [4], the block copolymer (D) is used in an amount of usually 1 to 30 parts by weight, preferably 3 to 25 parts by weight, more preferably 5 to 20 parts by weight, based on 100 parts by weight of the total amount of the crystalline polyolefin resin (A), the block copolymer (B), the block copolymer (D), the olefin rubber (C), the softening agent (E) and the filler (F). However, the olefin rubber (C), the softening agent (E) and the filler (F) are used if necessary as described above, so that each amount thereof might be 0 part by weight.

If the block copolymer (D) is used in such an amount as defined above, a thermoplastic elastomer capable of providing a skin layer having high scratch resistance can be obtained. A molded article produced from this thermoplastic elastomer by means of injection molding shows good appearance.

The olefin rubber (C) which is used optionally in the thermoplastic elastomer [4] is identical with the olefin rubber (C) for forming the aforesaid thermoplastic elastomer [1]. Examples of the olefin rubber (C) used for the thermoplastic elastomer [4] include the above-listed copolymer rubbers (1) to (4) containing an α-olefin as a major component. The Mooney viscosities [$ML_{1+4}$ (100° C.)] of these copolymer rubbers are most preferably in the range of 30 to 150.

Similarly to the aforementioned thermoplastic elastomer [2], the olefin rubber (C) and other rubber than the olefin rubber (C) may be used in combination in the thermoplastic elastomer [4], with the proviso that the objects of the invention are not marred.

In the thermoplastic elastomer [4], the olefin rubber (C) is used, if necessary, in an amount of usually 1 to 30 parts by weight, preferably 3 to 25 parts by weight, more preferably 5 to 20 parts by weight, based on 100 parts by weight of the total amount of the crystalline polyolefin resin (A), the olefin rubber (C), the block copolymer (B), the block copolymer (D), the softening agent (E) and the filler (F). However, the softening agent (E) or the filler (F) is used optionally as described above, so that the amount thereof might be 0 part by weight.

If the olefin rubber (C) is used in such an amount as defined above, a thermoplastic elastomer capable of providing a skin layer excellent in flexibility and scratch resistance can be obtained.

In the thermoplastic elastomer [4], the softening agent (E) is used in an amount of usually 0 to 40% by weight, preferably 1 to 30% by-weight, more preferably 3 to 25% by weight, especially 5 to 20% by weight, based on 100% by weight of the total amount of the crystalline polyolefin resin (A), the olefin rubber (C), the block copolymer (B), the block copolymer (D), the softening agent (E) and the filler (F). However, the olefin rubber (C) is used optionally as described above, so that the amount thereof might be 0 part by weight.

If the softening agent (E) is used in an amount of 1 to 40% by weight, a thermoplastic elastomer having good flowability in the molding process can be obtained. A skin layer formed from this thermoplastic elastomer is excellent in scratch resistance.

The thermoplastic elastomer [3] and the thermoplastic elastomer [4] may further contain the aforementioned additives such as heat stabilizers, weathering stabilizers, anti-aging agents and antistatic agents, if necessary, with the proviso that the objects of the invention are not marred.

In this invention, the thermoplastic elastomer [3] and the thermoplastic elastomer [4] may have no crosslinked structure, but each of them preferably has a crosslinked structure.

The thermoplastic elastomer [3] and the thermoplastic elastomer [4] can be prepared by the same process as for preparing the aforementioned thermoplastic elastomer [1].

The thermoplastic elastomers [3] and [4] prepared as above and the aforesaid thermoplastic elastomer [2] can be subjected to coextrusion lamination. Hence, in the preparation of the thermoplastic elastomer laminate according to the invention, a substrate formed from the thermoplastic elastomer [2] and a skin layer formed from the thermoplastic elastomer [3] or [4] can be directly laminated without passing through a film (sheet) forming process, that is, the laminate can be prepared economically.

As described above, the first thermoplastic elastomer laminate of the invention is composed of a substrate formed from the thermoplastic elastomer [2] and a skin layer formed from the thermoplastic elastomer [3] or [4].

Accordingly, the first thermoplastic elastomer laminate of the invention can be obtained by laminating the skin layer on the substrate.

The method of laminating the skin layer on the substrate varies depending upon the shape of the final article, the size thereof and physical properties required, and there is no specific limitation.

Some of the lamination methods are described below.

(1) A method of fusion bonding the substrate and the skin layer together both beforehand prepared at a temperature not lower than than the melting point of at least one of the substrate and the skin layer by the use of a calender roll, a compression molding machine, etc.

(2) A method of fusion bonding one of the substrate and the skin layer which is beforehand molded in the form of a sheet onto the other which is extrusion molded or calendered.

(3) A method of fusion bonding the substrate and the skin layer together by simultaneously extruding them by means of a multi-layer extrusion molding machine (coextrusion molding).

Of these, the coextrusion molding method (3) is preferred.

In this invention, a laminate of the substrate and the skin layer can be also prepared by injecting two kinds of molten resins into a mold with different timing of the injection (two-layer injection molding). Further, a three-layer laminate consisting of a skin layer, a substrate and a skin layer superposed in this order can be obtained by injecting two kinds of molten resins into a mold with different timing of the injection similarly to the two-layer injection molding (i.e., so-called sandwich injection molding).

In this invention, it is preferred that the thickness of the substrate is in the range of 0.1 to 50 mm and the thickness of the skin layer is in the range of 5 μm to 20 mm.

In the first thermoplastic elastomer laminate of the invention, the substrate is formed from the thermoplastic elastomer which comprises the crystalline polyolefin resin (A) and the olefin rubber (C) and is partially or perfectly crosslinked, and, therefore, the substrate is excellent in heat resistance, heat aging resistance and elastomeric properties.

The skin layer is formed from the thermoplastic elastomer which contains the crystalline polyolefin resin (A) and the block copolymer (B), and if necessary, other components such as the block copolymer (D), the olefin rubber (C), the softening agent (E) and the filler (F), and accordingly the skin layer is excellent in scratch resistance.

Next, the second thermoplastic elastomer laminate according to the invention is described.

The second thermoplastic elastomer laminate of the invention comprises a substrate formed from the thermoplastic elastomer [2] and a skin layer formed from the aforesaid first olefin thermoplastic elastomer.

The second thermoplastic elastomer laminate of the invention is the same as the first thermoplastic elastomer laminate of the invention described above except for the skin layer.

The embodiments of the thermoplastic elastomer for forming the skin layer are the same as those described above.

Next, the third thermoplastic elastomer laminate according to the invention is described.

The third thermoplastic elastomer laminate of the invention comprises a substrate formed from the thermoplastic elastomer [2] and a skin layer formed from the aforesaid third olefin thermoplastic elastomer.

The third thermoplastic elastomer laminate of the invention is the same as the first thermoplastic elastomer laminate of the invention described above except for the skin layer.

The embodiments of the thermoplastic elastomer for forming the skin layer are the same as those described above.

Next, the fourth thermoplastic elastomer laminate according to the invention is described.

The fourth thermoplastic elastomer laminate of the invention comprises a substrate formed from a crystalline polyolefin resin and a skin layer formed from a specific thermoplastic elastomer.

The crystalline polyolefin resin for the use in the substrate of the fourth thermoplastic elastomer laminate according to the invention is, for example, a homopolymer or a copolymer of an α-olefin having 2 to 20 carbon atoms.

Examples of the crystalline polyolefin resins include homopolymers and copolymers described below.

(1) Ethylene homopolymer

The ethylene homopolymer may be prepared by any one of a low-pressure process and a high-pressure process.

(2) Copolymers of ethylene and not more than 10% by mol of α-olefins other than ethylene or vinyl monomers such as vinyl acetate and ethyl acrylate (3) Propylene homopolymer (4) Random copolymers of propylene and not more than by mol of α-olefins other than propylene (5) Block copolymers of propylene and not more than 30% by mol of α-olefins other than propylene (6) 1-Butene homopolymer (7) Random copolymers of 1-butene and not more than by mol of α-olefins other than 1-butene (8) 4-methyl-1-pentene homopolymer (9) Random copolymers of 4-methyl-1-pentene and not more than 20% by mol of α-olefins other than 4-methyl-1pentene

(10) Ultra-high-molecular weight polyethylene having an intrinsic viscosity [η], as measured in decalin at 135° C., of 10 to 40 dl/g

(11) Ultra-high-molecular weight polyethylene composition which is composed of 15 to 40% by weight of ultra-high-molecular weight polyethylene having an intrinsic viscosity [η], as measured in decalin at 135° C., of 10 to 40 dl/g and 60 to 85% by weight of polyethylene having an intrinsic viscosity [η], as measured in decalin at 135° C., of 0.1 to 5 dl/g, and which has an intrinsic viscosity [η], as measured in decalin at 135° C., of 3.5 to 8.3 dl/g Examples of the α-olefins include ethylene, propylene, 1-butene, 4-methyl-1-pentene, 1-hexene and 1-octene.

Of the above crystalline polyolefin resins, particularly preferred are a propylene homopolymer, a random copolymer of propylene and not more than 10% by mol of an α-olefin other than propylene, and a block copolymer of propylene and not more than 30 % by mol of an α-olefin other than propylene.

The crystalline polyolefin resin has a melt flow rate (MFR, measured in accordance with ASTM D 1238 at 230° C. under a load of 2.16 kg, ) of preferably not more than 50 g/10 min, more preferably not more than 20 g/10 min.

The crystallinity of the crystalline polyolefin resin, as measured by X-ray diffractometry, is in the range of usually 5 to 100%, preferably 20 to 80%.

The crystalline polyolefin resin may further contain additives such as softening agents of mineral oil, heat stabilizers, antistatic agents, weathering stabilizers, anti-aging agents, fillers, colorants and lubricants, if necessary, with the proviso that the objects of the invention are not marred.

The thermoplastic elastomer used for the skin layer of the fourth thermoplastic elastomer laminate according to the invention includes a thermoplastic elastomer containing the crystalline polyolefin resin for constituting the substrate-forming thermoplastic elastomer and the block copolymer (B) in the specific amounts, and a thermoplastic elastomer containing the above crystalline polyolefin, the block copolymer (B) and the block copolymer (D).

These thermoplastic elastomers may contain the olefin rubber (C), the softening agent (E) and the filler (F), if necessary.

Further, these thermoplastic elastomers may be non-crosslinked or partially crosslinked.

The crystalline polyolefin used for these thermoplastic elastomers has a melt flow rate (MFR, measured in accordance with ASTM D 1238 at 230° C. under a load of 2.16 kg, ) of preferably not more than 100 g/10 min, more preferably not more than 50 g/10 min.

In the thermoplastic elastomers, the crystalline polyolefin resin is used in an amount of 20 to 85 parts by weight, preferably 30 to 80 parts by weight, more preferably 35 to 75 parts by weight, based on 100 parts by weight of the total amount of the crystalline polyolefin resin and the block copolymer (B) or based on 100 parts by weight of the total amount of the crystalline polyolefin resin, the block copolymer (B) and the block copolymer (D).

If the crystalline polyolefin resin is used in such an amount as defined above, a thermoplastic elastomer having high moldability and capable of providing a skin layer excellent in scratch resistance and heat resistance can be obtained.

In the former thermoplastic elastomer, the block copolymer (B) is used in an amount of 15 to 80 parts by weight, preferably 20 to 70 parts by weight, more preferably 25 to 65 parts by weight, based on 100 parts by weight of the total amount of the crystalline polyolefin resin and the block copolymer (B).

In the latter thermoplastic elastomer, the block copolymer (B) is used in an amount of 12 to 79 parts by weight, preferably 17 to 67 parts by weight, more preferably 20 to 60 parts by weight, based on 100 parts by weight of the total amount of the crystalline polyolefin resin, the block copolymer (B) and the block copolymer (D).

If the block copolymer (B) is used in such an amount as defined above, a thermoplastic elastomer capable of providing a skin layer excellent in heat resistance and scratch resistance can be obtained.

In the latter thermoplastic elastomer, the block copolymer (D) is used in an amount of 1 to 30 parts by weight, preferably 3 to 25 parts by weight, more preferably 5 to 20 parts by weight, based on 100 parts by weight of the total amount of the crystalline polyolefin resin, the block copolymer (B) and the block copolymer (D).

If the block copolymer (D) is used in such an amount as defined above, a thermoplastic elastomer capable of providing a skin layer excellent in scratch resistance and appearance can be obtained.

The olefin rubber (C) is used, for example in the latter thermoplastic elastomer, in an amount of 1 to 40 parts by weight, preferably 3 to 35 parts by weight, more preferably 5 to 30 parts by weight, based on 100 parts by weight of the total amount of the crystalline polyolefin resin, the block copolymer (B) and the block copolymer (D).

If the olefin rubber (C) is used in such an amount as defined above, a thermoplastic elastomer capable of providing a skin layer excellent in flexibility and scratch resistance can be obtained.

The olefin rubber (C) and the aforesaid rubber other than the olefin rubber (C) may be used in combination, with the proviso that the objects of the invention are not marred.

The softening agent (E), the filler (F) and other additives as mentioned above may be used in the thermoplastic elastomer, if necessary, with the proviso that the objects of the invention are not marred. For example in the latter thermoplastic elastomer, the softening agent (E) and the filler (F) are used respectively in an amount of 0 to 40% by weight, preferably 1 to 35% by weight, more preferably 5 to 30% by weight, based on 100% by weight of the total amount of the crystalline polyolefin resin, the block copolymer (B), the block copolymer (D), the softening agent (E) and the filler (F).

If the softening agent (E) is used in an amount of 1 to 40% by weight, a thermoplastic elastomer having good flowability in the molding process can be obtained. A skin layer produced from this thermoplastic elastomer is excellent in scratch resistance.

The thermoplastic elastomer may further contain the aforementioned additives such as inorganic fillers, heat stabilizers, anti-aging agents, weathering stabilizers, antistatic agents and lubricants (e.g., metallic soap, waxes), with the proviso that the objects of the invention are not marred.

The thermoplastic elastomer for forming the skin layer may have no crosslinked structure, but preferably it has a crosslinked structure.

The thermoplastic elastomer can be prepared by mixing each components and then subjecting the resulting mixture to dynamic heat treatment in the presence or absence of an organic peroxide. If the dynamic heat treatment is carried out in the presence of the organic peroxide, a thermoplastic elastomer having a crosslinked structure can be obtained. If the dynamic heat treatment is carried out in the absence of the organic peroxide, a thermoplastic elastomer having no crosslinked structure can be obtained.

The organic peroxide is used in an amount of 0.05 to 3% by weight, preferably 0.1 to 1% by weight, based on 100% by weight of the total amount of the crystalline polyolefin, the block copolymer (B) and the the olefin rubber (C) used if necessary, or based on 100% by weight of the total amount of the crystalline polyolefin, the block copolymer (B), the block copolymer (D) and the olefin rubber (C) used if necessary.

In the partial crosslinking treatment using the organic peroxide, it is preferred to use the aforesaid crosslinking aid or polyfunctional vinyl monomer in an amount of 0.1 to 2% by weight, particularly 0.3 to 1% by weight, based on the total weight of the materials to be crosslinked.

The dynamic heat treatment is carried out in the same manner as described in the preparation of the thermoplastic elastomer [1].

The kneading temperature is in the range of usually the melting point of the crystalline polyolefin resin to 250° C., preferably 160° to 230° C., and the kneading time is preferably in the range of 1 to 10 minutes. The shear force applied is in the range of $10^2$ to $5\times10^4$ $sec^{-1}$ in terms of shear rate.

Thus, a thermoplastic elastomer which is partially crosslinked or uncrosslinked can be obtained.

The expression "partially crosslinked" means that the gel content (weight of cyclohexane-insoluble portion) as measured by the aforesaid method is for example not less than 10%, particularly not less than 20% and less than 98%. In the invention, the gel content is preferably not less than 30%.

The crystalline polyolefin resin for forming the substrate and the thermoplastic elastomer for forming the skin layer can be subjected to coextrusion lamination. Hence, in the preparation of the fourth thermoplastic elastomer laminate according to the invention, the substrate and the skin layer can be directly laminated without passing through a film (sheet) forming process, that is, the laminate can be prepared economically.

The fourth thermoplastic elastomer laminate of the invention can be obtained by laminating the skin layer on the substrate.

The lamination method, the thickness of the substrate and the thickness of the skin layer are identical with those in the first thermoplastic elastomer laminate of the invention.

In the fourth thermoplastic elastomer laminate of the invention, the substrate is formed from the crystalline polyolefin resin, and hence the substrate is excellent in heat resistance, heat aging resistance and rigidity.

The skin layer is formed from the thermoplastic elastomer containing the crystalline polyolefin resin and the block copolymer (B), and if necessary, the block copolymer (D), the olefin rubber (C) and the softening agent (E), the filler (F) and other additives as mentioned above, and accordingly the skin layer is excellent in scratch resistance, distortion recovery properties and softness to the touch.

Next, the fifth thermoplastic elastomer laminate according to the invention is described.

The fifth thermoplastic elastomer laminate of the invention is made up of a substrate formed from the crystalline polyolefin resin which is for the use in the fourth thermoplastic elastomer laminate and a skin layer formed from the first olefin thermoplastic elastomer.

The fifth thermoplastic elastomer laminate of the invention is the same as the fourth thermoplastic elastomer laminate described above except for the skin layer.

The embodiments of the thermoplastic elastomer for forming the skin layer are the same as those described above.

Next, the sixth thermoplastic elastomer laminate according to the invention is described.

The sixth thermoplastic elastomer laminate of the invention comprises a substrate formed from the crystalline polyolefin resin which is for the use in the fourth thermoplastic elastomer laminate and a skin layer formed from the third olefin thermoplastic elastomer.

The sixth thermoplastic elastomer laminate of the invention is the same as the fourth thermoplastic elastomer laminate described above except for the skin layer.

The embodiments of the thermoplastic elastomer for forming the skin layer are the same as those described above.

The aforementioned first to fourth olefin thermoplastic elastomers according to the invention can be used for not only the skin layers of the above-described laminates but also molded articles produced by rotational molding and molded articles produced by powder slush molding which may be provided with grain pattern on their surfaces.

EFFECT OF THE INVENTION

According to the present invention, there can be obtained olefin thermoplastic elastomers capable of providing molded articles which are lightweight, can be easily recycled, generate no harmful gas even when subjected to thermal disposal, and are excellent in scratch resistance and fabricability.

According to the present invention, there can be also obtained thermoplastic elastomer laminates which have prominently high bonding strength between the substrate and the skin layer, and are excellent in mechanical strength, heat resistance, heat aging resistance, weathering resistance, scratch resistance and dimensional stability.

The thermoplastic elastomer laminates of the invention are more lightweight and can be more easily recycled as compared with polyvinyl chloride resins, and moreover, they generate no harmful gas and suffer no greasiness on their surfaces caused by oozing of plasticizers.

Accordingly, the thermoplastic elastomer laminates of the invention can be effectively applied to not only uses in which scratch resistance is particularly required, e.g., automobile exterior and interior trim parts such as side protection mole and window mole, but also uses for furniture, building materials, housings for electrical appliances, bags, suitcases, sporting goods, office supplies, miscellaneous goods, etc.

EXAMPLE

The present invention is further described below with reference to the following examples, but it should be construed that the invention is in no way limited to those examples.

EXAMPLE 1

40 Parts by weight of pellets of a propylene homopolymer [melt flow rate (ASTM D 1238, 230° C., 2.16 kg): 20 g/10 min, crystallinity as measured by X-ray diffractometry: 73% hereinafter referred to as "(A-1)"] as the crystalline polyolefin resin (A), 30 parts by weight of pellets of a styrene/isoprene/styrene block copolymer [styrene content: 20% by weight, content of "1,2-bonds" and "3,4-bonds" in the isoprene polymer portion: 55% melt flow rate (ASTM D 1238, 230° C. 2.16 kg): 2.5 g/10 min, hereinafter referred to as "(B-1)"] as the block copolymer (B) and 30 parts by weight of an ethylene/propylene/5-ethylidene-2-norbornene copolymer rubber [ethylene content: 70% by mol, iodine value: 14, Mooney viscosity $ML_{1+4}$ (100° C.): 62, hereinafter referred to as "(C-1)"] as the olefin rubber (C) were kneaded at 180° C. for 5 minutes in a nitrogen atmosphere by the use of a Banbury mixer. Then, the resulting kneadate was passed through rolls to give a sheet, and the sheet was cut by a sheet cutter to prepare square pellets.

Then, 100 parts by weight of the square pellets, 0.3 part by weight of dicumyl peroxide and 0.5 part by weight of divinylbenzene were mixed and stirred by a Henschel mixer, and the resulting mixture was extruded at 220° C. by means of a single-screw extruder (L/D: 30, screw diameter: 50 mm) to prepare pellets of a thermoplastic elastomer. The gel content of the thermoplastic elastomer thus obtained was 79%.

The pellets of the thermoplastic elastomer were molded into a square plate (150 mm×150 mm×3 mm) at 220° C. by the use of an injection molding machine.

The square plate thus obtained was evaluated on the appearance by visual inspection.

Further, on the square plate was placed a felt cloth of 20 mm×20 mm, and a weight was put thereon so that a pressure of 200 g/cm$^2$ was applied to the square plate. The felt cloth with the weight was subjected to reciprocating motions of 100 times on the square plate, and the glossiness (JIS K 7105) of surface of the square plate was measured before and after the reciprocating motions. From the change of the glossiness, the scratch resistance of the surface of the square plate was evaluated.

The results are set forth in Table 1.

EXAMPLE 2

The procedures of Example 1 were repeated except for varying the amounts of (A-1), (B-1) and (C-1) to 22 parts by weight, 33 parts by weight and 45 parts by weight, respectively, and using a process oil of mineral oil [PW-380, available from Idemitsu Kosan Co., Ltd., hereinafter referred to as "(E-1)"] in an amount of 11 parts by weight as the softening agent (E), to prepare a thermoplastic elastomer so as to obtain a square plate. The square plate thus obtained was evaluated on the appearance and the scratch resistance in the same manner as described in Example 1.

The results are set forth in Table 1.

EXAMPLE 3

The procedures of Example 1 were repeated except for varying the amount of each of (A-1) and (C-1) to 20 parts by weight and using pellets of a hydrogenation product of a block copolymer comprising a styrene polymer block, an isoprene/butadiene copolymer block and a styrene polymer block [block copolymer (B), styrene content: 20% by weight, butadiene content in the isoprene/butadiene copolymer block: 12% by weight, content of "1,2-bonds" and "3,4-bonds" in the isoprene/butadiene copolymer portion: 60%, melt flow rate (ASTM D 1238, 230° C., 2.16 kg): 2.1 g/10 min, hereinafter referred to as "(B-2)"] in an amount of 65 parts by weight in place of (B-1), to prepare a thermoplastic elastomer so as to obtain a square plate. The square plate thus obtained was evaluated on the appearance and the scratch resistance in the same manner as described in Example 1.

The results are set forth in Table 1.

EXAMPLE 4

The procedures of Example 1 were repeated except for varying the amounts of (A-1), (B-1) and (C-1) to 70 parts by weight, 20 parts by weight and 10 parts by weight, respectively, to prepare a thermoplastic elastomer so as to obtain a square plate. The square plate thus obtained was evaluated on the appearance and the scratch resistance in the same manner as described in Example 1.

The results are set forth in Table 1.

EXAMPLE 5

The procedures of Example 1 were repeated except for varying the amount of (C-1) to 22 parts by weight, using pellets of a propylene/ethylene copolymer [crystalline polyolefin resin (A), ethylene content: 3.2% by mol, melt flow rate (ASTM D 1238, 230° C. 2.16 kg): 25 g/10 min, crystallinity as measured by X-ray diffractometry: 66% hereinafter referred to as "(A-2)"] in an amount of 45 parts by weight in place of (A-1), using (B-2) in an amount of 33 parts by weight in place of (B-1), and further using pellets of a hydrogenation product of a block copolymer comprising a styrene polymer block, a butadiene polymer block and a styrene polymer block [styrene content: 40% by weight, melt flow rate (ASTM D 1238, 230° C., 2.16 kg): 15 g/10 min, hereinafter referred to as "(D-1)"] in an amount of 11 parts by weight as the block copolymer (D), to prepare a thermoplastic elastomer so as to obtain a square plate. The square plate thus obtained was evaluated on the appearance and the scratch resistance in the same manner as described in Example 1.

The results are set forth in Table 1.

EXAMPLE 6

The procedures of Example 1 were repeated except for using (A-2) in an amount of 45 parts by weight and a linear low-density polyethylene resin [crystalline polyolefin resin (A), comonomer: 1-butene, density: 0.920 g/cm$^3$, melting point: 120° C., melt flow rate (ASTM D 1238, 230° C., 2.16 kg): 31 g/10 min, crystallinity as measured by X-ray diffractometry: 52%, hereinafter referred to as "(A-3)"] in an amount of 11 parts by weight in place of (A-1), using (B-2) in an amount of 22 parts by weight in place of (B-1), using an ethylene/butene copolymer [olefin rubber (C), ethylene content: 85% by mol, melt flow rate (ASTM D 1238, 230° C., 2.16 kg): 8.1 g/10 min, hereinafter referred to as "(C-2)"] in an amount of 22 parts by weight in place of (C-1), and using (E-1) in an amount of 11 parts by weight, to prepare a thermoplastic elastomer so as to obtain a square plate. The square plate thus obtained was evaluated on the appearance and the scratch resistance in the same manner as described in Example 1.

The results are set forth in Table 1.

COMPARATIVE EXAMPLE 1

The procedures of Example 1 were repeated except for varying the amount of (C-1) to 60 parts by weight and not using (B-1), to prepare a thermoplastic elastomer so as to obtain a square plate. The square plate thus obtained was evaluated on the appearance and the scratch resistance in the same manner as described in Example 1.

The results are set forth in Table 1.

COMPARATIVE EXAMPLE 2

The procedures of Example 1 were repeated except for varying the amounts of (A-1) and (C-1) to 57 parts by weight and 43 parts by weight, respectively, not using (B-1) and using (D-1) in an amount of 43 parts by weight, to prepare a thermoplastic elastomer so as to obtain a square plate. The square plate thus obtained was evaluated on the appearance and the scratch resistance in the same manner as described in Example 1.

The results are set forth in Table 1.

COMPARATIVE EXAMPLE 3

From the square pellets of the thermoplastic elastomer obtained before using dicumyl peroxide and divinylbenzene in Example 1, a square plate was produced in the same manner as described in Example 1. The square plate thus obtained was evaluated on the appearance and the scratch resistance in the same manner as described in Example 1.

The results are set forth in Table 1.

COMPARATIVE EXAMPLE 4

The procedures of Example 1 were repeated except for varying the amounts of (A-1), (B-1) and (C-1) to 60 parts by weight, 5 parts by weight and 35 parts by weight, respectively, to prepare a thermoplastic elastomer so as to obtain a square plate. The square plate thus obtained was evaluated on the appearance and the scratch resistance in the same manner as described in Example 1.

The results are set forth in Table 1.

TABLE 1

| | Example | | | | | | Comp. Example | | | |
|---|---|---|---|---|---|---|---|---|---|---|
| | 1 | 2 | 3 | 4 | 5 | 6 | 1 | 2 | 3 | 4 |
| Composition | | | | | | | | | | |
| Crystalline polyolefin resin (A) | | | | | | | | | | |
| (A-1) | 40 | 22 | 20 | 70 | — | — | 40 | 57 | 40 | 60 |
| (A-2) | — | — | — | — | 45 | 45 | — | — | — | — |
| (A-3) | — | — | — | — | — | 11 | — | — | — | — |
| Block copolymer (B) | | | | | | | | | | |
| (B-1) | 30 | 33 | — | 20 | — | — | — | — | 30 | 5 |
| (B-2) | — | — | 65 | — | 33 | 22 | — | — | — | — |
| Olefin rubber (C) | | | | | | | | | | |
| (C-1) | 30 | 45 | 15 | 10 | 22 | — | 60 | 43 | 30 | 35 |
| (C-2) | — | — | — | — | — | 22 | — | — | — | — |
| Block copolymer (D) | | | | | | | | | | |
| (D-1) | — | — | — | — | 11 | — | — | 43 | — | — |
| Softening agent (E) | | | | | | | | | | |
| (F-1) | — | 11 | — | — | — | 11 | — | — | — | — |
| Organic peroxide (dicumyl peroxide) | 0.3 | 0.3 | 0.3 | 0.3 | 0.3 | 0.3 | 0.3 | 0.3 | 0 | 0.3 |
| Divnylbenzene | 0.5 | 0.5 | 0.5 | 0.5 | 0.5 | 0.5 | 0.5 | 0.5 | 0 | 0.5 |
| Gel content [%] | 79 | 76 | 34 | 87 | 58 | 73 | 95 | 67 | — | 93 |
| Appearance of molded article (*1) | AA | AA | AA | AA | AA | AA | AA | AA | BB | AA |
| Scratch resistance (*2) | AA | AA | AA | AA | AA | AA | BB | BB | AA | BB |
| Glossiness before reciprocating motion of felt cloth [%] | 27 | 18 | 48 | 59 | 40 | 29 | 10 | 29 | 85 | 13 |
| Glossiness after reciprocating motion of felt cloth [%] | 25 | 17 | 48 | 56 | 37 | 26 | 3 | 15 | 83 | 5 |

Remark:
Appearance of molded article *1
AA: The appearance was good.
BB: A number of fish scale patterns were observed on the square plate surface.
Scratch resistance *2
AA: The scratch resistance was good.
BB: The surface of the square plate was easily damaged.
The unit of the value of each component is part(s) by weight.

EXAMPLE 7

100 Parts by weight of the thermoplastic elastomer obtained in Example 1 and 30 parts by weight of (A-3) as the crystalline polyolefin resin were sufficiently mixed and stirred, and the resulting mixture was extruded by means of a single-screw extruder set at 200° C. to obtain pellets of a thermoplastic elastomer. From this thermoplastic elastomer, a square plate was produced in the same manner as described in Example 1. The square plate thus obtained was evaluated on the appearance and the scratch resistance in the same manner as described in Example 1.

The results are set forth in Table 2.

COMPARATIVE EXAMPLE 5

100Parts by weight of the thermoplastic elastomer obtained in Example 1 and 70 parts by weight of (A-3) as the crystalline polyolefin resin were sufficiently mixed and stirred, and the resulting mixture was extruded by means of a single-screw extruder set at 200° C. to obtain pellets of a thermoplastic elastomer. From this thermoplastic elastomer, a square plate was produced in the same manner as described in Example 1. The square plate thus obtained was evaluated on the appearance and the scratch resistance in the same manner as described in Example 1.

The results are set forth in Table 2.

TABLE 2

| | Example 7 | Comparative Example 5 |
|---|---|---|
| Composition | | |
| Thermoplastic elastomer of Example 1 | 100 | 100 |
| Crystalline polyolefin resin (A-3) | 30 | 70 |
| Appearance of molded article (*1) | AA | AA |
| Scratch resistance (*2) | AA | BB |
| Glossiness before reciprocating motion of felt cloth [%] | 35 | 42 |
| Glossiness after reciprocating motion of felt cloth [%] | 32 | 29 |

Remark:
Appearance of molded article *1
AA: The appearance was good.
BB: A number of fish scale patterns were observed on the square plate surface.
Scratch resistance *2
AA: The scratch resistance was good.
BB: The surface of the square plate was easily damaged.
The unit of the value of each component is part(s) by weight.

EXAMPLE 8

20 Parts by weight of polypropylene [melt flow rate (ASTM D 1238-65T, 230° C., 2.16 kg): 13 g/10 min, density: 0.91 g/cm$^3$, crystallinity as measured by X-ray diffractometry: 72%] as the crystalline polyolefin resin and 80 parts by weight of an ethylene/propylene/5-ethylidene-2-norbornene copolymer rubber [ethylene content: 70% by weight, iodine value: 12, Mooney viscosity $ML_{1+4}$ (100° C.): 120] as the olefin rubber were kneaded at 180° C. for 5 minutes in a nitrogen atmosphere by the use of a Banbury mixer. Then, the resulting kneadate was passed through rolls to give a sheet, and the sheet was cut by a sheet cutter to prepare square pellets.

Then, 100 parts by weight of the square pellets, 0.3 part by weight of 1,3-bis(tert-butylperoxyisopropyl)benzene and 0.5 part by weight of divinylbenzene were mixed and stirred by a Henschel mixer, and the resulting mixture was extruded at 220° C. in a nitrogen atmosphere by means of a single-screw extruder (L/D: 30, screw diameter: 50 mm) to prepare pellets of a thermoplastic elastomer [hereinafter referred to as "TPE-(1)"]. The gel content of TPE-(1) thus obtained was 84%.

Thereafter, 70 parts by weight of the pellets of TPE-(1) and 30 parts by weight of pellets of the styrene/isoprene/styrene block copolymer (B-1) as the block copolymer (B) were sufficiently mixed and stirred, and the resulting mixture was extruded at 220° C. by means of a single-screw extruder (L/D: 30, screw diameter: 50 mm) to prepare pellets of a thermoplastic elastomer.

The pellets of the thermoplastic elastomer were molded into a square plate (120 mm×150 mm×3 mm) at 220° C. using an injection molding machine.

The square plate thus obtained was evaluated on the scratch resistance in the same manner as described in Example 1.

The results are set forth in Table 3.

EXAMPLE 9

The procedures of Example 8 were repeated except for varying the amount of TPE-(1) to 20 parts by weight, and using the hydrogenation product (B-2) of the block copolymer comprising the styrene polymer block, the isoprene/butadiene copolymer block and the styrene polymer block in an amount of 80 parts by weight in place of (B-1), to prepare a thermoplastic elastomer so as to obtain a square plate. The square plate thus obtained was evaluated on the scratch resistance in the same manner as described in Example 1.

The results are set forth in Table 3.

EXAMPLE 10

The procedures of Example 8 were repeated except for varying the amount of TPE-(1) to 50 parts by weight, using (B-2) in an amount of 50 parts by weight in place of (B-1), and further using a propylene/ethylene random copolymer [ethylene content: 3% by mol, melt flow rate (ASTM D 1238, 230° C., 2.16 kg): 15 g/10 min, crystallinity as measured by X-ray diffractometry: 67%, hereinafter referred to as "(A-4)"] in an amount of 50 parts by weight as the crystalline polyolefin resin, to prepare a thermoplastic elastomer so as to obtain a square plate. The square plate thus obtained was evaluated on and the scratch resistance in the same manner as described in Example 1.

The results are set forth in Table 3.

EXAMPLE 11

The procedures of Example 8 were repeated except for varying the amount of TPE-(1) to 50 parts by weight, using (B-2) in an amount of 50 parts by weight in place of (B-1), and further using 1-polybutene [melt flow rate (ASTM D 1238 230° C. 2.16 kg): 11 g/10 min, crystallinity as measured by X-ray diffractometry: 53%, hereinafter referred to as "(A-5)"] in an amount of 50 parts by weight as the crystalline polyolefin resin, to prepare a thermoplastic elastomer so as to obtain a square plate. The square plate thus obtained was evaluated on the scratch resistance in the same manner as described in Example 1.

The results are set forth in Table 3.

EXAMPLE 12

The procedures of Example 8 were repeated except for varying the amount of TPE-(1) to 50 parts by weight, using (B-2) in an amount of 50 parts by weight in place of (B-1), and further using an ethylene/propylene copolymer [ethylene content: 78% by mol, Mooney viscosity $ML_{1+4}$ (100° C.): 14, hereinafter referred to as "(C-3)"] in an amount of 50 parts by weight as the olefin rubber, to prepare a thermoplastic elastomer so as to obtain a square plate. The square plate thus obtained was evaluated on the scratch resistance in the same manner as described in Example 1.

The results are set forth in Table 3.

EXAMPLE 13

The procedures of Example 8 were repeated except for varying the amount of TPE-(1) to 50 parts by weight, using (B-2) in an amount of 50 parts by weight in place of (B-1), and further using (A-4) in an amount of 30 parts by weight and an ethylene/propylene/5-ethylidene-2-norbornene copolymer rubber [ethylene content: 82% by mol, iodine value: 8, Mooney viscosity $ML_{1+4}$ (100° C.): 72, hereinafter referred to as "(C-4)"] as the olefin rubber in an amount of 20 parts by weight, to prepare a thermoplastic elastomer so as to obtain a square plate. The square plate thus obtained was evaluated on the scratch resistance in the same manner as described in Example 1.

The results are set forth in Table 3.

EXAMPLE 14

The procedures of Example 8 were repeated except for varying the amount of TPE-(1) to 50 parts by weight, using (B-2) in an amount of 50 parts by weight in place of (B-1), and further using (A-4) in an amount of 30 parts by weight, (C-3) in an amount of 20 parts by weight and the mineral oil type process oil (E-1) as the softening agent in an amount of 20 parts by weight, to prepare a thermoplastic elastomer so as to obtain a square plate. The square plate thus obtained was evaluated on the scratch resistance in the same manner as described in Example 1.

The results are set forth in Table 3.

COMPARATIVE EXAMPLE 6

The procedures of Example 8 were repeated except for varying the amount of TPE-(1) to 20 parts by weight and using a hydrogenation product of a styrene/butadiene/styrene block copolymer [styrene content: 20% by weight, melt flow rate (ASTM D 1238, 230° C. 2.16 kg): 2.8 g/10 min, hereinafter referred to as "(B-3)"] in an amount of 80 parts by weight in place of (B-1), to prepare a thermoplastic elastomer so as to obtain a square plate. The square plate thus obtained was evaluated on the scratch resistance in the same manner as described in Example 1.

The results are set forth in Table 3.

COMPARATIVE EXAMPLE 7

The procedures of Example 8 were repeated except for varying the amounts of TPE-(1) and (B-1) to 20 parts by weight and 0 part by weight, respectively, and using (C-3) in an amount of 80 parts by weight, to prepare a thermoplastic elastomer so as to obtain a square plate. The square plate thus obtained was evaluated on the scratch resistance in the same manner as described in Example 1.

The results are set forth in Table 3.

TABLE 3

| | Example | | | | | | | Comp. Ex. | |
|---|---|---|---|---|---|---|---|---|---|
| | 8 | 9 | 10 | 11 | 12 | 13 | 14 | 6 | 7 |
| Composition | | | | | | | | | |
| Theremoplastic elastomer [1] TPE-(1) | 70 | 20 | 50 | 50 | 50 | 50 | 50 | 20 | 20 |
| Block copolymer (B) | | | | | | | | | |
| (B-1) | 30 | — | — | — | — | — | — | — | — |
| (B-2) | — | 80 | 50 | 50 | 50 | 50 | 50 | — | — |
| (B-3) | — | — | — | — | — | — | — | 80 | — |
| Crystalline polyolefin resin (A) | | | | | | | | | |
| (A-4) | — | — | 50 | — | — | 30 | 30 | — | — |
| (A-5) | — | — | — | 50 | — | — | — | — | — |
| Olefin rubber (C) | | | | | | | | | |
| (C-3) | — | — | — | — | 50 | — | 20 | — | 80 |
| (C-4) | — | — | — | — | — | 20 | — | — | — |
| Softening agent (E) | | | | | | | | | |
| (E-1) | — | — | — | — | — | — | 20 | — | — |
| Scratch resistance (*1) | AA | AA | AA | AA | AA | AA | AA | BB | BB |
| Glossiness before reciprocating motion of felt cloth [%] | 15 | 52 | 35 | 32 | 29 | 31 | 35 | 56 | 60 |
| Glossiness after reciprocating motion of felt cloth [%] | 15 | 50 | 34 | 32 | 28 | 31 | 33 | 21 | 17 |

Remark:
Scratch resistance *1
AA: The scratch resistance was good.
BB: The surface of the square plate was easily damaged.
The unit of the value of each component is part(s) by weight

EXAMPLE 15

56 Parts by weight of pellets of the propylene homopolymer (A-1), 44 parts by weight of pellets of a hydrogenation product of a styrene/isoprene/styrene block copolymer [styrene content: 20% by weight, content of "1,2-bonds" and "3,4-bonds" in the isoprene polymer portion: 55% MFR (ASTM D 1238-65T, 230° C. load of 2.16 kg): 2.0 g/10 min, hereinafter referred to as "(B-4)"], 11 parts by weight of pellets of a hydrogenation product of a styrene/isoprene/styrene block copolymer [styrene content: 30% by weight, content of "1,2-bonds" and "3,4-bonds" in the isoprene polymer portion: 7% MFR (ASTM D 1238-65T 230° C., load of 2.16 kg): 8 g/10 min, hereinafter referred to as "(D-2)"] and 2.8 parts by weight of a silicone oil [SH200, available from Toray Silicone Co., Ltd., hereinafter referred to as "(a-1)"] were kneaded at 180° C. for 5 minutes in a nitrogen atmosphere by the use of a Banbury mixer. Then, the resulting kneadate was passed through rolls to give a sheet, and the sheet was cut by a sheet cutter to prepare square pellets.

Then, the square pellets were extruded at 220° C. in a nitrogen atmosphere by means of a single-screw extruder (L/D: 30, screw diameter: 50 mm) to prepare pellets of a thermoplastic elastomer.

The pellets of the thermoplastic elastomer were molded into a square plate (150 mm×150 mm×3 mm) at 220° C. using an injection molding machine.

The square plate thus obtained was evaluated on the scratch resistance in the same manner as described in Example 1.

The results are set forth in Table 4.

EXAMPLE 16

56 Parts by weight of pellets of the propylene homopolymer (A-1), 44 parts by weight of pellets of the hydrogenation product (B-4) of the styrene/isoprene/styrene block copolymer and 11 parts by weight of pellets of the hydrogenation product (D-2) of the styrene/isoprene/styrene block copolymer were sufficiently mixed by means of Henshel mixer. Then, the resulting mixture was fed into a cylinder from a hopper in a single-screw extruder (L/D: 30, screw diameter: 50 mm), while the silicone oil (a-1) was directly fed into the cylinder through an opening provided at a cylinder metering zone by the used of a plunger pump so that the amount of the silicone oil added became 2.8 parts by weight, and the resulting mixture was extruded at 220° C. in a nitrogen atmosphere to prepare pellets of a thermoplastic elastomer.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

EXAMPLE 17

56 Parts by weight of pellets of the propylene homopolymer (A-i), 44 parts by weight of pellets of the hydrogenation product (B-4) of the styrene/isoprene/styrene block copolymer, 11 parts by weight of pellets of the hydrogenation product (D-2) of the styrene/isoprene/styrene block copolymer and 0.3 part by weight of distearyl phthalate (b-1) were sufficiently mixed by means of Henschel mixer. Then, the resulting mixture was extruded at 220° C. in a nitrogen atmosphere by the use of a twin-screw extruder to prepare pellets of a thermoplastic elastomer.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

EXAMPLE 18

The procedures of Example 17 were repeated except for using glycerol monostearate (b-2) in place of distearyl phthalate (b-1), to prepare pellets of a thermoplastic elastomer.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

EXAMPLE 19

The procedures of Example 17 were repeated except for using glycerol montanate (b-3) fin place of distearyl phthalate (b-1), to prepare pellets of a thermoplastic elastomer.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

EXAMPLE 20

The procedures of Example 17 were repeated except for using a polyvinylidene fluoride resin [KF Polymer-W-1000, available from Kureha Co., Ltd., hereinafter referred to as "(c-1)"] in an amount of 5.6 parts by weight in place of distearyl phthalate (b-1), to prepare pellets of a thermoplastic elastomer.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

EXAMPLE 21

The procedures of Example 15 were repeated except for varying the amounts of the propylene homopolymer (A-1), the hydrogenation product (B-4) of the styrene/isoprene/styrene block copolymer, the hydrogenation product (D-2) of the styrene/isoprene/styrene block copolymer and the silicone oil (a-1) to 70 parts by weight, 30 parts by weight, 0 part by weight and 2.5 parts by weight, respectively, to prepare pellets of a thermoplastic elastomer.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

EXAMPLE 22

The procedures of Example 15 were repeated except for using pellets of a propylene/ethylene copolymer [ethylene content: 3% by mol, MFR (ASTM D 1238-65T, 230° C., load of 2.16 kg): 20 g/10 min, crystallinity as measured by D-ray diffractometry: 73%, hereinafter referred to as "(A-6)"] in an amount of 69 parts by weight in place of the propylene homopolymer (A-1), using pellets of the block copolymer (B-2) comprising the styrene polymer block, the isoprene/butadiene copolymer block and the styrene polymer block in an amount of 31 parts by weight in place of the hydrogenation product (B-4) of the styrene/isoprene/styrene block copolymer, using pellets of the hydrogenation product (D-1) of the styrene/butadiene/styrene block copolymer in an amount of 11 parts by weight in place of the hydrogenation product (D-2) of the styrene/isoprene/styrene block copolymer, further using pellets of an ethylene/1-butene copolymer rubber [ethylene content: 84 % by mol, Mooney viscosity $ML_{1+4}$ (100° C.): 10, hereinafter referred to as "(C-5)"] in an amount of 15 parts by weight and the process oil of mineral oil (E-1) in an amount of 31 parts by weight, and varying the amount of the silicone oil (a-1) to 3.8 parts by weight, to prepare pellets of a thermoplastic elastomer.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

EXAMPLE 23

57 Parts by weight of pellets of the propylene homopolymer (A-1), 43 parts by weight of pellets of the hydrogenation product (B-4) of the styrene/isoprene/styrene block copolymer, 43 parts by weight of pellets of the ethylene/propylene/5-ethylidene-2-norbornene copolymer rubber (C-1) and 3.6 parts by weight of the silicone oil (a-1) were kneaded at 180° C. for 5 minutes in a nitrogen atmosphere by the use of a Banbury mixer. Then, the resulting kneadate was passed through rolls to give a sheet, and the sheet was cut by a sheet cutter to prepare square pellets.

Then, 100 parts by weight of the square pellets, 0.4 part by weight of dicumyl peroxide and 0.7 part by weight of divinylbenzene were mixed and stirred by a Henschel mixer, and the resulting mixture was extruded at 220° C. by means of a single-screw extruder (L/D: 30, screw diameter: 50 mm) to prepare pellets of a thermoplastic elastomer. The gel content of the thermoplastic elastomer thus obtained was 79%.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

EXAMPLE 24

The procedures of Example 23 were repeated except for using distearyl phthalate (b-1) in an amount of 0.4 part by weight in place of the silicone oil (a-1), to prepare pellets of a thermoplastic elastomer. The gel content of the thermoplastic elastomer thus obtained was 79%.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

EXAMPLE 25

The procedures of Example 23 were repeated except for using the polyvinylidene fluoride resin (c-1) in an amount of 7.2 parts by weight in place of the silicone oil (a-1), to prepare pellets of a thermoplastic elastomer. The gel content of the thermoplastic elastomer thus obtained was 80%.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

EXAMPLE 26

The procedures of Example 23 were repeated except for using pellets of the propylene/ethylene copolymer (A-6) in an amount of 71 parts by weight in place of the propylene homopolymer (A-1), using pellets of the block copolymer (B-2) comprising the styrene polymer block, the isoprene/butadiene copolymer block and the styrene polymer block in an amount of 29 parts by weight in place of the hydrogenation product (B-4) of the styrene/isoprene/ethylene block copolymer, using distearyl phthalate (b-1) in an amount of 0.4 part by weight in place of the silicone oil (a-1), varying the amount of the ethylene/propylene/5-ethylidene-2-norbornene copolymer rubber (C-1) to 21 parts by weight, and further using pellets of the hydrogenation product (D-1) of the styrene/butadiene/styrene block copolymer in an amount of 7.1 parts by weight and the process oil of mineral oil (E-1) in an amount of 14 parts by weight, to prepare pellets of a thermoplastic elastomer. The gel content of the thermoplastic elastomer thus obtained was 71%.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

EXAMPLE 27

20 Parts by weight of polypropylene [MFR: 13 g/10 min, crystallinity as measured by D-ray diffractometry: 72%] as the crystalline polyolefin resin and 80 parts by weight of an ethylene/propylene/5-ethylidene-2-norbornene copolymer rubber [ethylene content: 70% by mol, iodine value: 12, Mooney viscosity $ML_{1+4}$ (100° C.): 120] as the olefin rubber were kneaded at 180° C. for 5 minutes in a nitrogen atmosphere by the use of a Banbury mixer. Then, the resulting kneadate was passed through rolls to give a sheet, and the sheet was cut by a sheet cutter to prepare square pellets.

Then, 100 parts by weight of the square pellets, 0.3 part by weight of 1,3-bis (tert-butylperoxyisopropyl) benzene and 0.5 part by weight of divinylbenzene were mixed and stirred by a Henschel mixer, and the resulting mixture was extruded at 220° C. in a nitrogen atmosphere by means of a single-screw extruder (L/D: 30, screw diameter: 50 mm) to prepare pellets of a thermoplastic elastomer (F-1).

The gel content of the thermoplastic elastomer (F-1) thus obtained was 84%.

Thereafter, using 30 parts by weight of pellets of the hydrogenation product (B-4) of the styrene/isoprene/styrene block copolymer, 70 parts by weight of the pellets of the above-prepared olefin thermoplastic elastomer (F-1) and 2.5 parts by weight of the silicone oil (a-1), pellets of a thermoplastic elastomer were prepared in the same manner as described in Example 15.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

EXAMPLE 28

The procedures of Example 27 were repeated except for varying the amounts of the hydrogenation product (B-4) of the styrene/isoprene/styrene block copolymer, the olefin thermoplastic elastomer (F-1) and the silicone oil (a-1) to 55 parts by weight, 45 parts by weight and 3.7 parts by weight, respectively, and further using pellets of the propylene homopolymer (A-1) in an amount of 22 parts by weight, pellets of the hydrogenation product (D-2) of the styrene/isoprene/styrene block copolymer in an amount of 7.5 parts by weight, pellets of the ethylene/1-butene copolymer rubber (C-5) in an amount of 15 parts by weight and calcium stearate (E-2) in an amount of 4.5 parts by weight, to prepare pellets of a thermoplastic elastomer.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

COMPARATIVE EXAMPLE 8

The procedures of Example 15 were repeated except for not using the silicone oil (a-1), to prepare pellets of a thermoplastic elastomer.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

COMPARATIVE EXAMPLE 9

The procedures of Example 15 were repeated except for varying the amounts of the propylene homopolymer (A-1), the hydrogenation product (B-4) of the styrene/isoprene/styrene block copolymer, the hydrogenation product (D-2) of the styrene/isoprene/styrene block copolymer and the silicone oil (a-1) to 70 parts by weight, 30 parts by weight, 0 part by weight and 0 part by weight, respectively, to prepare pellets of a thermoplastic elastomer.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

COMPARATIVE EXAMPLE 10

The procedures of Example 15 were repeated except for using pellets of the propylene/ethylene copolymer (A-6) in an amount of 69 parts by weight in place of the propylene homopolymer (A-1), using pellets of the block copolymer (B-2) comprising the styrene polymer block, the isoprene/butadiene copolymer block and the styrene polymer block in an amount of 31 parts by weight in place of the hydrogenation product (B-4) of the styrene/isoprene/styrene block copolymer, using pellets of the hydrogenation product (D-1) of the styrene/butadiene/styrene block copolymer in an amount of 7.7 parts by weight in place of the hydrogenation product (D-2) of the styrene/isoprene/styrene block copolymer, further using pellets of the ethylene/1butene copolymer rubber (C-5) in an amount of 15 parts by weight and the process oil of mineral oil (E-1) in an amount of 31 parts by weight, and not using the silicone oil (a-1), to prepare pellets of a thermoplastic elastomer.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

COMPARATIVE EXAMPLE 11

The procedures of Example 23 were repeated except for not using the silicone oil (a-1), to prepare pellets of a thermoplastic elastomer. The gel content of the thermoplastic elastomer thus obtained was 78%.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

COMPARATIVE EXAMPLE 12

The procedures of Example 23 were repeated except for using pellets of the propylene/ethylene copolymer (A-6) in an amount of 71 parts by weight in place of the propylene homopolymer (A-1), using pellets of the block copolymer (B-2) comprising the styrene polymer block, the isoprene/butadiene copolymer block and the styrene polymer block in an amount of 29 parts by weight in place of the hydrogenation product (B-4) of the styrene/isoprene/styrene block copolymer, varying the amount of the ethylene/propylene/5-ethylidene-2-norbornene copolymer rubber (C-1) to 21 parts by weight, further using pellets of the hydrogenation product (D-1) of the styrene/butadiene/styrene block copolymer in an amount of 7.1 parts by weight and the process oil of mineral oil (E-1) in an amount of 14 parts by weight, and not using the silicone oil (a-1), to prepare pellets of a thermoplastic elastomer. The gel content of the thermoplastic elastomer thus obtained was 71%.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

COMPARATIVE EXAMPLE 13

The procedures of Example 27 were repeated except for not using the silicone oil (a-1), to prepare pellets of a thermoplastic elastomer.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

COMPARATIVE EXAMPLE 14

The procedures of Example 27 were repeated except for varying the amounts of the hydrogenation product (B-4) of the styrene/isoprene/styrene block copolymer and the olefin thermoplastic elastomer (F-1) to 55 parts by weight and 45 parts by weight, respectively, further using pellets of the propylene homopolymer (A-1) in an amount of 22 parts by weight, pellets of the hydrogenation product (D-2) of the styrene/isoprene/styrene block copolymer in an amount of 0 7.5 parts by weight, pellets of the ethylene/1-butene copolymer rubber (C-5) in an amount of 15 parts by weight and calcium stearate (E-2) in an amount of 4.5 parts by weight, and not using the silicone oil (a-1), to prepare pellets of a thermoplastic elastomer.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

COMPARATIVE EXAMPLE 15

The procedures of Example 15 were repeated except for varying the amounts of the propylene homopolymer (A-1), the hydrogenation product (B-4) of the styrene/isoprene/styrene block copolymer, the hydrogenation product (D-2) of the styrene/isoprene/styrene block copolymer and the silicone oil (a-1) to 100 parts by weight, 0 part by weight, 43 parts by weight and 3.6 parts by weight, respectively, to prepare pellets of a thermoplastic elastomer.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

COMPARATIVE EXAMPLE 16

The procedures of Example 27 were repeated except for varying the hydrogenation product (B-4) of the styrene/isoprene/styrene block copolymer, the olefin thermoplastic elastomer (F-1) and the silicone oil (a-1) to 0 part by weight, 100 parts by weight and 3.6 parts by weight, respectively, and further using pellets of the hydrogenation product (D-2) of the styrene/propylene/styrene block copolymer in an amount of 7.5 parts by weight, to prepare pellets of a thermoplastic elastomer.

Then, from the pellets of the thermoplastic elastomer, a square plate was produced in the same manner as described in Example 15. The square plate thus obtained was evaluated on the scratch resistance in the same manner as described in Example 1.

The results are set forth in Table 4.

TABLE 4

| | Composition of thermoplastic elastomer (parts by weight) | | | | | | | |
|---|---|---|---|---|---|---|---|---|
| | Crystalline polyolefin resin (A) | Block copolymer (B) | Block copolymer (D) | Olefin rubber (C) | Softening agent (E) | Thermoplastic elastomer (F) | Components (a), (b) & (c) | Crosslinking agent |
| Ex. 15 | A-1 56 | B-4 44 | D-2 11 | — | — | — | a-1 2.8 | — |
| Ex. 16 | A-1 56 | B-4 44 | D-2 11 | — | — | — | a-1 2.8 | — |
| Ex. 17 | A-1 56 | B-4 44 | D-2 11 | — | — | — | b-1 0.3 | — |
| Ex. 18 | A-1 56 | B-4 44 | D-2 11 | — | — | — | b-2 0.3 | — |
| Ex. 19 | A-1 56 | B-4 44 | D-2 11 | — | — | — | b-3 0.3 | — |
| Ex. 20 | A-1 56 | B-4 44 | D-2 11 | — | — | — | c-1 5.6 | — |
| Ex. 21 | A-1 70 | B-4 30 | — | — | — | — | a-1 2.5 | — |
| Ex. 22 | A-6 69 | B-2 31 | D-1 7.7 | C-5 15 | E-1 31 | — | a-1 3.8 | — |
| Ex. 23 | A-1 57 | B-4 43 | — | C-1 43 | — | — | a-1 3.6 | DCP 0.4<br>DVB 0.7 |
| Ex. 24 | A-1 57 | B-4 43 | — | C-1 43 | — | — | b-1 0.4 | DCP 0.4<br>DVB 0.7 |
| Ex. 25 | A-1 57 | B-4 43 | — | C-1 43 | — | — | c-1 7.2 | DCP 0.4<br>DVB 0.7 |
| Ex. 26 | A-6 71 | B-2 29 | D-1 7.1 | C-1 21 | E-1 14 | — | b-1 0.4 | DCP 0.4<br>DVB 0.7 |
| Ex. 27 | — | B-4 30 | — | — | — | F-1 70 | a-1 2.5 | — |
| Ex. 28 | A-1 22 | B-4 55 | D-2 7.5 | C-5 15 | E-2 4.5 | F-1 45 | a-1 3.7 | — |

| | Gel content | Glossiness [%] | | Scratch |
|---|---|---|---|---|
| | [%] | before test | after test | resistance |
| Ex. 15 | | 84 | 84 | AA |
| Ex. 16 | | 84 | 83 | AA |
| Ex. 17 | | 86 | 86 | AA |
| Ex. 18 | | 85 | 86 | AA |
| Ex. 19 | | 86 | 85 | AA |
| Ex. 20 | | 65 | 70 | AA |

TABLE 4-continued

| | Gel content [%] | Glossiness [%] before test | Glossiness [%] after test | Scratch resistance |
|---|---|---|---|---|
| Ex. 21 | | 84 | 84 | AA |
| Ex. 22 | | 83 | 82 | AA |
| Ex. 23 | 79 | 32 | 29 | AA |
| Ex. 24 | 79 | 34 | 30 | AA |
| Ex. 25 | 80 | 18 | 14 | AA |
| Ex. 26 | 71 | 35 | 32 | AA |
| Ex. 27 | | 8 | 8 | AA |
| Ex. 28 | | 28 | 29 | AA |

| | Composition of thermoplastic elastomer (parts by weight) | | | | | | | |
|---|---|---|---|---|---|---|---|---|
| | Crystalline polyolefin resin (A) | Block copolymer (B) | Block copolymer (D) | Olefin rubber (C) | Softening agent (E) | Thermoplastic elastomer (F) | Components (a), (b) & (c) | Crosslinking agent |
| Comp. Ex. 8 | A-1 56 | B-4 44 | D-2 11 | — | — | — | — | — |
| Comp. Ex. 9 | A-1 70 | B-4 30 | — | — | — | — | — | — |
| Comp. Ex. 10 | A-6 69 | B-2 31 | D-1 7.7 | C-5 15 | E-1 31 | — | — | — |
| Comp. Ex. 11 | A-1 57 | B-4 43 | — | C-1 43 | — | — | — | DCP 0.4<br>DVB 0.7 |
| Comp. Ex. 12 | A-6 71 | B-2 29 | D-1 7.1 | C-1 21 | E-1 14 | — | — | DCP 0.4<br>DVB 0.7 |
| Comp. Ex. 13 | — | B-4 30 | — | — | — | F-1 70 | — | — |
| Comp. Ex. 14 | A-1 22 | B-4 55 | D-2 7.5 | C-5 15 | E-2 4.5 | F-1 45 | — | — |
| Comp. Ex. 15 | A-1 100 | — | D-2 43 | — | — | — | a-1 3.6 | — |
| Comp. Ex. 16 | — | — | D-2 43 | — | — | F-1 100 | a-1 3.6 | — |

| | Gel content [%] | Glossiness [%] before test | Glossiness [%] after test | Scratch resistance |
|---|---|---|---|---|
| Comp. Ex. 8 | | 85 | 58 | BB |
| Comp. Ex. 9 | | 86 | 52 | BB |
| Comp. Ex. 10 | | 85 | 44 | BB |
| Comp. Ex. 11 | 78 | 27 | 13 | BB |
| Comp. Ex. 12 | 71 | 32 | 10 | BB |
| Comp. Ex. 13 | | 8 | 4 | BB |
| Comp. Ex. 14 | | 27 | 9 | BB |
| Comp. Ex. 15 | | 85 | 62 | BB |
| Comp. Ex. 16 | | 9 | 5 | BB |

DCP: dicumyl peroxide
DVB: divinylbenzene

EXAMPLE 29

[Preparation of a thermoplastic elastomer for forming a substrate]

20 Parts by weight of polypropylene [melt flow rate (ASTM D 1238-65T, 230° C., 2.16 kg): 13 g/10 min, density: 0.91 g/cm$^3$, crystallinity as measured by X-ray diffractometry: 72% hereinafter referred to as "(A-7)"] as the crystalline polyolefin resin (A), 80 parts by weight of an ethylene/propylene/5-ethylidene-2-norbornene copolymer rubber [ethylene content: 70% by weight, iodine value: 12, Mooney viscosity $ML_{1+4}$ (100° C.): 120, hereinafter referred to as "(C-6)"] as the olefin rubber (C) were kneaded at 180° C. for 5 minutes in a nitrogen atmosphere by the use of a Banbury mixer. Then, the resulting kneadate was passed through rolls to give a sheet, and the sheet was cut by a sheet cutter to prepare square pellets.

Then, 100 parts by weight of the square pellets, 0.3 part by weight of 1,3-bis(tert-butylperoxyisopropyl)benzene and 0.5 part by weight of divinylbenzene were mixed and stirred by a Henschel mixer, and the resulting mixture was extruded at 220° C. in a nitrogen atmosphere by means of a single-screw extruder (L/D: 30, screw diameter: 50 mm) to prepare pellets of a thermoplastic elastomer [hereinafter referred to as "TPE-(2)"]. The gel content of TPE-(2) thus obtained was 84%.

[Preparation of a thermoplastic elastomer for forming a skin layer]

50 Parts by weight of pellets of the propylene homopolymer (A-1) as the crystalline polyolefin resin (A) and 50 parts by weight of pellets of the styrene/isoprene/styrene block copolymer (B-1) as the block copolymer (B) are sufficiently mixed, and the resulting mixture was extruded by means of a single-screw extruder set at 220° C. to prepare a thermoplastic elastomer [hereinafter referred to as "TPE-(3)"].

[Preparation of a laminate]

The above TPE-(2) was subjected to extrusion molding at 230° C. and simultaneously the above TPE-(3) was subjected to coextrusion molding on the surface of the TPE-(2) Thus, a laminate (width: 5.2 mm) consisting of a substrate (thickness: 10 mm) formed from TPE-(2) and a skin layer (thickness: 1.0 mm) formed from TPE-(3) was obtained.

The laminate thus obtained was measured on the bonding strength between the substrate and the skin layer and the change of glossiness which served as an indication of the scratch resistance of the surface of the skin layer in accordance with the following test methods.

(a) Bonding strength test between substrate and skin layer
Test method: 180° peel test
Test specimen: 25 mm in width, 100 mm in length
Tensile rate: 25 mm/min
Bonding strength between substrate and skin layer:
a value obtained by dividing the peel load by the width of the test specimen [kgf/cm]

(b) Scratch resistance test

On the skin layer of the laminate was placed a felt cloth of 20 mm×20 mm, and a weight was put thereon so that a pressure of 200 g/cm$^2$ was applied to the skin layer. The felt cloth with the weight was subjected to reciprocating motions of 100 times on the skin layer, and the glossiness (JIS K 7105) of the skin layer was measured before and after the reciprocating motions. The scratch resistance of the surface of the skin layer was evaluated by the change of the glossiness.

The results are set forth in Table 5.

EXAMPLE 30

[Preparation of a thermoplastic elastomer for forming a skin layer]

From 40 parts by weight of pellets of (A-2) as the crystalline polyolefin resin (A), 50 parts by weight of pellets of (B-1) as the block copolymer (B) and 10 parts by weight of pellets of (D-2) as the block copolymer (D), pellets of a thermoplastic elastomer [hereinafter referred to as "TPE-(4)"] was prepared in the same manner as described in Example 29.

[Preparation of a laminate]

The above TPE-(2) and TPE-(4) were subjected to coextrusion lamination in the same manner as described in Example 29, to obtain a laminate consisting of a substrate formed from TPE-(2) and a skin layer formed from TPE-(4).

The laminate thus obtained was measured on the bonding strength between the substrate and the skin layer and the change of glossiness which served as an indication of the scratch resistance of the surface or the skin layer in accordance with the above test methods.

The results are set forth in Table 5.

EXAMPLE 31

[Preparation of a thermoplastic elastomer for forming a skin layer]

From 64 parts by weight of pellets of (A-2) as the crystalline polyolefin resin (A), 29 parts by weight of pellets of (B-2) as the block copolymer (B), 7 parts by weight of pellets of (D-1) as the block copolymer (D), 14 parts by weight of (C-5) as the olefin rubber (C) and 29 parts by weight of the process oil of mineral oil (E-1) as the softening agent (E), pellets of a thermoplastic elastomer [hereinafter referred to as "TPE-(5)"] was prepared in the same manner as described in Example 29.

[Preparation of a laminate]

The above TPE-(2) and TPE-(5) were subjected to coextrusion lamination in the same manner as described in Example 29, to obtain a laminate consisting of a substrate formed from TPE-(2) and a skin layer formed from TPE-(5).

The laminate thus obtained was measured on the bonding strength between the substrate and the skin layer and the change of glossiness which served as an indication of the scratch resistance of the surface of the skin layer in accordance with the above test methods.

The results are set forth in Table 5.

EXAMPLE 32

[Preparation of a thermoplastic elastomer for forming a substrate]

14 Parts by weight of pellets of polypropylene [melt flow rate (ASTM D 1238-65T, 230° C., 2.16 kg): 11 g/10 min, density: 0.91 g/cm$^3$, crystallinity as measured by X-ray diffractometry: 70%, hereinafter referred to as "(A-8)"] as the crystalline polyolefin resin (A), 64 parts by weight of pellets of an ethylene/propylene/5-ethylidene-2norbornene copolymer rubber having 40 PHR oil extension of a paraffinic process oil [ethylene content: 78% by weight, iodine value: 13, Mooney viscosity $ML_{1+4}$ (100° C.): 75, hereinafter referred to as "(C-7)"] as the olefin rubber (C), 14 parts by weight of pellets of a butyl rubber [Mooney viscosity $ML_{1+4}$ (100° C.): 45, isoprene content: 1.0% by mol] as other rubber than the olefin rubber and 8 parts by weight of a paraffinic process oil as a softening agent were kneaded at 180° C. for 5 minutes in a nitrogen atmosphere by the use of a Banbury mixer. Then, the resulting kneadate was passed through rolls to give a sheet, and the sheet was cut by a sheet cutter to prepare square pellets.

Then, 100 parts by weight of the square pellets and a solution of 0.3 part by weight of 1,3-bis(tertbutylperoxyisopropyl)benzene in 0.5 part by weight of divinylbenzene were mixed and stirred to uniformly attach the solution onto the square pellets.

Then, the pellets were extruded at 210° C. in a nitrogen atmosphere by means of a single-screw extruder to prepare pellets of a thermoplastic elastomer [hereinafter referred to as "TPE-(6")]. The gel content of TPE-(6) thus obtained was 78%.

[Preparation of a thermoplastic elastomer for forming a skin layer]

From 50 parts by weight of pellets of (A-2) as the crystalline polyolefin resin (A), 37.5 parts by weight of pellets of (B-2) as the block copolymer (B), 12.5 parts by weight of pellets of (D-1) as the block copolymer (D), 25 parts by weight of (C-1) as the olefin rubber (C), 0.38 part by weight of dicumyl peroxide and 0.5 part by weight of divinylbenzene, pellets of a thermoplastic elastomer [hereinafter referred to as "TPE-(7)"] was prepared in the same manner as described in Example 29. The gel content of TPE-(7) thus obtained was 58%.

[Preparation of a laminate]

The above TPE-(6) and TPE-(7) were subjected to coextrusion lamination in the same manner as described in Example 29, to obtain a laminate consisting of a substrate formed from TPE-(6) and a skin layer formed from TPE-(7).

The laminate thus obtained was measured on the bonding strength between the substrate and the skin layer and the change of glossiness which served as an indication of the scratch resistance of the surface of the skin layer in accordance with the above test methods.

The results are set forth in Table 5.

COMPARATIVE EXAMPLE 17

[Preparation of a thermoplastic elastomer for forming a skin layer]

From 50 parts by weight of pellets of (A-1) as the crystalline polyolefin resin (A) and 50 parts by weight of pellets of (D-2) as the block copolymer (D), pellets of a thermoplastic elastomer [hereinafter referred to as "TPE-(8)"] was prepared in the same manner as described in Example 29.

[Preparation of a laminate]

The above TPE-(2) and TPE-(8) were subjected to coextrusion lamination in the same manner as described in Example 29, to obtain a laminate consisting of a substrate formed from TPE-( 2) and a skin layer formed from TPE-(8).

The laminate thus obtained was measured on the bonding strength between the substrate and the skin layer and the change of glossiness which served as an indication of the scratch resistance of the surface of the skin layer in accordance with the above test methods.

The results are set forth in Table 5.

TABLE 5

| | Example | | | | Comp. Ex. |
|---|---|---|---|---|---|
| | 29 | 30 | 31 | 32 | 17 |
| Thermoplastic elastomer for forming a substrate | | | | | |
| Crystalline polyolefin resin (A) | | | | | |
| (A-7) [part(s) by weight] | 20 | 20 | 20 | — | 20 |
| (A-8) [part(s) by weight] | — | — | — | 14 | — |
| Olefin rubber (C) | | | | | |
| (C-6) [part(s) by weight] | 80 | 80 | 80 | — | 80 |
| (C-7) [part(s) by weight] | — | — | — | 64 | — |
| Butyl rubber [part(s) by weight] | — | — | — | 14 | — |
| Softening agent [part(s) by weight] | — | — | — | 8 | — |
| Organic peroxide (1) [part(s) by weight] | 0.3 | 0.3 | 0.3 | 0.3 | 0.3 |
| Divinylbenzene [part(s) by weight] | 0.5 | 0.5 | 0.5 | 0.5 | 0.5 |
| Thermoplastic elastomer for forming a skin layer | | | | | |
| Crystalline polyolefin resin (A) | | | | | |
| (A-1) [part(s) by weight] | 50 | 40 | — | — | 50 |
| (A-2) [part(s) by weight] | — | — | 64 | 50 | — |
| Block copolymer (B) | | | | | |
| (B-1) [part(s) by weight] | 50 | 50 | — | — | — |
| (B-2) [part(s) by weight] | — | — | 29 | 37.5 | — |
| Block copolymer (D) | | | | | |
| (D-2) [part(s) by weight] | — | 10 | — | — | 50 |
| (D-1) [part(s) by weight] | — | — | 7 | 12.5 | — |
| Olefin rubber (C) | | | | | |
| (C-5) [part(s) by weight] | — | — | 14 | — | — |
| (C-1) [part(s) by weight] | — | — | — | 25 | — |
| Softening agent (E-1) [part(s) by weight] | — | — | 29 | — | — |
| Organic peroxide (2) [part(s) by weight] | — | — | — | 0.38 | — |
| Divinylbenzene [part(s) by weight] | — | — | — | 0.5 | — |
| Physical properties of laminate | | | | | |
| Bonding strength (peel strength) [kgf/cm] | material destruct. | material destruct. | material destruct. | material destruct. | material destruct. |
| Scratch resistance | AA | AA | AA | AA | BB |
| Glossiness before reciprocation motion of felt cloth | 73 | 74 | 70 | 45 | 75 |
| Glossiness after reciprocation motion of felt cloth | 73 | 72 | 67 | 42 | 32 |

Remark:
Organic peroxide (1): 1,3-bis(tert-butylperoxyisopropyl)benzene
Organic peroxide (2): dicumyl peroxide
Scratch resistance
AA: The scratch resistance was good.
BB: The surface of the skin layer was easily damaged.
The unit of the glossiness is %.
The unit of the value of each component is part(s) by weight.

EXAMPLE 33

[Preparation of a thermoplastic elastomer for forming a skin layer]

50 Parts by weight of pellets of (A-1) as the crystalline polyolefin resin and 50 parts by weight of pellets of (B-1) as the block copolymer (B) were sufficiently mixed, and the resulting mixture was extruded by means of a single-screw extruder set at 220° C., to prepare pellets of a thermoplastic elastomer [hereinafter referred to as "TPE-(9)"].

[Preparation of a laminate]

A polypropylene homopolymer [melt flow rate: 0.5 g/10 min, crystallinity as measured by X-ray diffractometry: 70%] as the crystalline polyolefin resin for forming a substrate was subjected to extrusion molding at 230° C., and simultaneously the above TPE-(9) was subjected to coextrusion molding on the surface of the polypropylene homopolymer. Thus, a laminate (width: 5.2 mm) consisting of a substrate (thickness: 10 mm) formed from the polypropylene homopolymer and a skin layer (thickness: 1.0 mm )formed from TPE-(9) was obtained.

The laminate thus obtained was measured on the bonding strength between the substrate and the skin layer and the scratch resistance of the surface of the skin layer in accordance with the above test methods.

The results are set forth in Table 6.

EXAMPLE 34

From 40 parts by weight of pellets of (A-1) as the crystalline polyolefin resin, 50 parts by weight of pellets of (B-1) as the block copolymer (B) and 10 parts by weight of pellets of a styrene/isoprene/styrene block copolymer [styrene content: 30% by weight, content of "1,2-bonds" and "3,4-bonds" in the isoprene polymer portion: 7% melt flow rate: 8 g/10 min, hereinafter referred to as "(D-3)"] as the block copolymer (D), pellets of a thermoplastic elastomer [hereinafter referred to as "TPE-(10)"] was prepared in the same manner as described in Example 33.

[Preparation of a laminate]

The procedure for preparing the laminate in Example 33 was repeated except for using TPE-(10) in place of TPE-(9), to obtain a laminate consisting of a substrate formed from the propylene homopolymer and a skin layer formed from TPE-(10).

The laminate thus obtained was measured on the bonding strength between the substrate and the skin layer and the change of glossiness which served as an indication of the scratch resistance of the surface of the skin layer in accordance with the above test methods.

The results are set forth in Table 6.

EXAMPLE 35

From 64.3 parts by weight of pellets of (A-2) as the crystalline polyolefin resin, 28.6 parts by weight of pellets of (B-2) as the block copolymer (B), 7.1 parts by weight of pellets of (D-1) as the block copolymer (D), 14.3 parts by weight of pellets of (C-5) as the olefin rubber (C) and 28.6 parts by weight of (E-1) as the softening agent, pellets of a thermoplastic elastomer [hereinafter referred to as "TPE-(11)"] was prepared in the same manner as described in Example 33.

[Preparation of a laminate]

The procedure for preparing the laminate in Example 33 was repeated except for using TPE-(11) in place of TPE-(9), to obtain a laminate consisting of a substrate formed from the propylene homopolymer and a skin layer formed from TPE-(11).

The laminate thus obtained was measured on the bonding strength between the substrate and the skin layer and the change of glossiness which served as an indication of the scratch resistance of the surface of the skin layer in accordance with the above test methods.

The results are set forth in Table 6.

EXAMPLE 36

From 50 parts by weight of pellets of (A-2) as the crystalline polyolefin resin, 37.5 parts by weight of pellets of (B-2) as the block copolymer (B), 12.5 parts by weight of pellets of (D-1) as the block copolymer (D), 25 parts by weight of (C-1) as the olefin rubber (C), 0.375 part by weight of dicumyl peroxide and 0.5 part by weight of divinylbenzene, pellets of a thermoplastic elastomer [hereinafter referred to as "TPE-(12)"] was prepared in the same manner as described in Example 33. The gel content of TPE (12) thus obtained was 58%.

[Preparation of a laminate]

The procedure for preparing the laminate in Example 33 was repeated except for using TPE-(12) in place of TPE-(9), to obtain a laminate consisting of a substrate formed from the propylene homopolymer and a skin layer formed from TPE-(12).

The laminate thus obtained was measured on the bonding strength between the substrate and the skin layer and the change of glossiness which served as an indication of the scratch resistance of the surface of the skin layer in accordance with the above test methods.

The results are set forth in Table 6.

TABLE 6

| | Example | | | |
|---|---|---|---|---|
| | 33 | 34 | 35 | 36 |
| Thermoplastic elastomer for forming a skin layer | | | | |
| Crystalline polyolefin resin | | | | |
| (A-1) [part(s) by weight] | 50 | 40 | — | — |
| (A-2) [part(s) by weight] | — | — | 64.3 | 50 |
| Block copolymer (B) | | | | |
| (B-1) [part(s) by weight] | 50 | 50 | — | — |
| (B-2) [part(s) by weight] | — | — | 28.6 | 37.5 |

TABLE 6-continued

| | Example | | | |
|---|---|---|---|---|
| | 33 | 34 | 35 | 36 |
| Block copolymer (D) | | | | |
| (D-3) [part(s) by weight] | — | 10 | — | — |
| (D-1) [part(s) by weight] | — | — | 7.1 | 12.5 |
| Olefin rubber (C) | | | | |
| (C-5) [part(s) by weight] | — | — | 14.3 | — |
| (C-1) [part(s) by weight] | — | — | — | 25 |
| Softening agent (E) | | | | |
| (E-1) [part(s) by weight] | — | — | 28.6 | — |
| Dicumyl peroxide [part(s) by weight] | — | — | — | 0.375 |
| Divinylbenzene [part(s) by weight] | — | — | — | 0.5 |
| Physical properties of laminate | | | | |
| Bonding strength (peel strength) [kgf/cm] | material destruction | material destruction | material destruction | material destruction |
| Scratch resistance | AA | AA | AA | AA |
| Glossiness before reciprocation motion of felt cloth | 74 | 74 | 70 | 43 |
| Glossiness after reciprocation motion of felt cloth | 74 | 72 | 66 | 40 |

Remark:
Scratch resistance
AA: The scratch resistance was good.
BB: The surface of the skin layer was easily damaged.
The unit of the glossiness is %.

What is claimed is:

1. An olefin thermoplastic elastomer which comprises a partially crosslinked thermoplastic elastomer comprising:

(I) a crystalline polyolefin resin (A) in an amount of 20 to 80 parts by weight;

(II) a block copolymer or a hydrogenated block copolymer (B) in an amount of 15 to 75 parts by weight, said block copolymers each comprises:

(a) a polymer block of a styrene selected from the group consisting of styrene, α-methylstyrene, 3-methylstyrene, 4-propylstyrene, 4-cyclohexylstyrene, 4-dodecylstyrene, 2-ethyl-4-benzylstyrene and 4-(phenylbutyl)styrene, and (b) a polymer or copolymer block which is an isoprene polymer block or an isoprene/butadiene copolymer block and contains at least 40% of isoprene units bonding at 1,2- or 3,4-positions relative to the total isoprene units; and (III) an ethylene/e-olefin copolymer rubber or ethylene/α-olefin/non-conjugated diene copolymer rubber (C) in an amount of 5 to 65 parts by weight; and the total amount of said components (A), (B) and (C) being 100 parts by weight.

2. The olefin thermoplastic elastomer as claimed in claim 1, wherein the crystalline polyolefin resin (A) is a propylene homopolymer or a propylene/α-olefin copolymer having a melt flow rate, measured at 230° C. load of 2.16 kg, of 0.01 to 100 g/10 min and a crystallinity, measured by X-ray diffractometry, of 20 to 80%.

3. The olefin thermoplastic elastomer as claimed in claim 1 or 2, wherein the block copolymer contains the polymer block of a styrene (a) in an amount of 5 to 50% by weight.

4. The olefin thermoplastic elastomer as claimed in claim 1 or 2, wherein the olefin rubber (C) has a Mooney viscosity, of 30 to 150.

5. The olefin thermoplastic elastomer as claimed in claim 1 or 2, which further comprises a crystalline polyolefin resin in an amount of 5 to 50 parts by weight relative to 100 parts by weight of the partially crosslinked thermoplastic elastomer.

6. An olefin thermoplastic elastomer which is partially crosslinked and comprises:

(I) a crystalline polyolefin resin (A) in an amount of 20 to 85 parts by weight;

(II) a block copolymer or a hydrogenated block copolymer (B) in an amount of 15 to 80 parts by weight, said block copolymers each comprises:

(a) a polymer block of a styrene selected from the group consisting of styrene, α-methylstyrene, 3-methylstyrene, 4-propylstyrene, 4-cyclohexylstyrene, 4-dodecylstyrene, 2-ethyl-4-benzylstyrene and 4-(phenylbutyl)styrene, and (b) a polymer or copolymer block which is an isoprene polymer block or an isoprene/butadiene copolymer block and contains at least 40% of isoprene units bonding at 1,2- or 3,4-positions relative to the total isoprene units, the total amount of said components (A) and (B) being 100 parts by weight; and (III) at least one element selected from the group consisting of (a) silicone oil having a kinematic viscosity of 10 to 30,000 cSt at 25° C. (b) an ester of an aliphatic alcohol and a dicarboxylic acid or a fatty acid and (c) a fluorine polymer in an amount of 0.01 to 10 parts by weight.

7. An olefin thermoplastic elastomer which is partially crosslinked and comprises:

100 to 40% by weight of polymer components comprising:

(I) a crystalline polyolefin resin (A) in an amount of 20 to 85 parts by weight;

(II) a block copolymer or a hydrogenated block copolymer (B) in an amount of 15 to 80 parts by weight, said block copolymers each comprises:

(a) a polymer block of a styrene selected from the group consisting of styrene, α-methylstyrene, 3-methylstyrene, 4-propylstyrene, 4-cyclohexylstyrene, 4-dodecylstyrene, 2-ethyl-4-benzylstyrene and 4-(phenylbutyl)styrene, and (b) a polymer or copolymer block which is an isoprene block or an isoprene/butadiene copolymer block and contains at least 40% of isoprene units bonding at 1,2- or 3,4-positions relative to the total isoprene units, and (III) an ethylene/α-olefin copolymer rubber or ethylene/α-olefin/non-conjugated diene copolymer rubber (C) in an amount of 0 to 40 parts by weight, the total amount of said components (A), (B) and (C) being 100 parts by weight;

(IV) 0 to 40% by weight of a softening agent (E), and 0 to 40% by weight of a filler (F), the total amount of said components (A)+(B)+(C)+(E)+(F) being 100 parts by weight; and (V) at least one element selected from the group consisting of (a) silicone oil having a kinematic viscosity of 10 to 30,000 cSt at 25° C. (b) an ester of an aliphatic alcohol and a dicarboxylic acid or a fatty acid and (c) a fluorine polymer in an amount of 0.101 to 10 parts by weight.

8. The olefin thermoplastic elastomer as claimed in claim 6 or 7, wherein the crystalline polyolefin resin (A) is a propylene homopolymer or a propylene/α-olefin copolymer having a melt flow rate, measured at 230° C., load of 2.16 kg, of 0.01 to 100 g/10 min and a crystallinity, measured by X-ray diffractometry, of 20 to 80%.

9. The olefin thermoplastic elastomer as claimed in claim 6 or 7, wherein the block copolymer (B) contains the polymer block of a styrene (a) in an amount of 5 to 50% by weight.

10. The olefin thermoplastic elastomer as claimed in claim 7, wherein the olefin rubber (C) has a Mooney viscosity, $ML_{1+4}$ (100° C.) of 30 to 150.

11. An olefin thermoplastic elastomer comprising:

(I) a thermoplastic elastomer (1) in an amount of 10 to 80 parts by weight, which comprises a crystalline, polyolefin resin (A) and an ethylene/α-olefin copolymer rubber or ethylene/α-olefin/non-conjugated diene copolymer rubber (C) and said copolymer (C) is crosslinked; and (II) a block copolymer or a hydrogenated block copolymer (B) in an amount of 20 to 90 parts by weight, said block copolymer each comprises:

(a) a polymer block of a styrene selected from the group consisting of styrene, α-methylstyrene, 3-methylstyrene, 4-propylstyrene, 4-cyclohexylstyrene, 4-dodecylstyrene, 2-ethyl-4-benzylstyrene and 4-(phenylbutyl)styrene, (b) a polymer or copolymer block which is an isoprene polymer block or an isoprene/butadiene copolymer block and contains at least 40% of isoprene units bonding at 1,2- or 3,4-positions relative to the total isoprene units;

the total amount of said components (1) and (B) being 100 parts by weight.

12. The olefin thermoplastic elastomer as claimed in claim 11, which further comprises at least one element selected from the group consisting of a crystalline polyolefin resin (A) in an amount of 5 to 100 parts by weight, an ethylene/α-olefin copolymer rubber or ethylene/α-olefin/non-conjugated diene copolymer rubber (C) in an amount of 5 to 100 parts by weight and a softening agent (E) in an amount of 3 to 100 parts by weight relative to 100 parts by weight of the total amount of said components (1) and (B).

13. The olefin thermoplastic elastomer as claimed in claim 11, which further comprises (III) at least one element selected form the group consisting of (a) silicone oil having a kinematic viscosity of 10 to 30,000 cSt at 25° C. (b) an ester of an aliphatic alcohol and a dicarboxylic acid or a fatty acid and (c) a fluorine polymer in an amount of 0.01 to 10 parts by weight relative to 100 parts by weight of the total amount of said component (1) and (B).

14. The olefin thermoplastic elastomer as claimed in claim 11, which further comprises:

(III) a softening agent (E), and a filler (F), wherein the total amount of said components (A), (B) and (C) being 100 to 40% by weight, the amount of said softening agent (E) being 0 to 40% by weight, the amount of said filler being 0 to 40% by weight, and the total amount of said component (A), (B), (C), (E) and (F) being 100% by weight; and (IV) at least one element selected form the group consisting of (a) silicone oil having a kinematic viscosity of 10 to 30,000 cSt at 25°, (b) an ester of aliphatic alcohol and dicarboxylic acid or fatty acid and (c) a fluorine polymer in an amount of 0.01 to 10 parts by weight.

15. An olefin thermoplastic elastomer which comprises a partially crosslinked thermoplastic elastomer comprising:

(I) a crystalline polyolefin resin (A) in an amount of 20 to 80 parts by weight, wherein the crystalline polyolefin resin (A) is a propylene homopolymer or a propylene/α-olefin copolymer having a melt flow rate, measured at 230° C. load of 2 16 kg, of 0.01 to 100 g/10 min and a crystallinity, measured by x-ray diffractometry, of 20 to 80%;

(II) a block copolymer or a hydrogenated block copolymer (B) in an amount of 15 to 75 parts by weight, said block copolymers each comprises:

(a) a polymer block of a styrene selected from the group consisting of styrene, α-methylstyrene, 3-methylstyrene, 4-propylstyrene, 4-cyclohexylstyrene, 4-dodecylstyrene, 2-ethyl-4-benzylstyrene and 4-(phenylbutyl)styrene, and (b) a polymer or copolymer block which is an isoprene polymer block or an isoprene/butadiene copolymer block and contains at least 40% of isoprene units bonding at 1,2- or 3,4-positions relative to the total isoprene units, and the block copolymer (B) contains the polymer block of a styrene (a) in an amount of 5 to 50% by weight; and (III) an ethylene/e-olefin copolymer rubber or ethylene/α-olefin/non-conjugated diene copolymer rubber (C) in an amount of 5 to 65 parts by weight, wherein the olefin rubber (C) has a Mooney viscosity, $ML_{1+4}$ (100° C.) of 30 to 150; and the total amount of said components (A), (B) and (C) being 100 parts by weight.

16. An olefin thermoplastic elastomer as claimed in claim 15, which further comprises a crystalline polyolefin resin in an amount of 5 to 50 parts by weight relative to 100 parts by weight of the partially crosslinked thermoplastic elastomer.

17. An olefin thermoplastic elastomer which is partially crosslinked and comprises:

(I) a crystalline polyolefin resin (A) in an amount of 20 to 85 parts by weight, wherein the crystalline polyolefin resin (A) is a propylene homopolymer or a propylene/α-olefin copolymer having a melt flow rate, measured at 230° C. load of 2.16 kg, of 0.01 to 100 g/10 min and a crystallinity, measured by X-ray diffractometry, of 20 to 80%;

(II) a block copolymer or a hydrogenated block copolymer (B) in an amount of 15 to 80 parts by weight, said block copolymers each comprises:

(a) a polymer block of a styrene selected from the group consisting of styrene, α-methylstyrene, 3-methylstyrene, 4-propylstyrene, 4-cyclohexylstyrene, 4-dodecylstyrene, 2-ethyl-4-benzylstyrene and 4-(phenylbutyl)styrene, and (b) a polymer or copolymer block which is an isoprene polymer block or an isoprene/butadiene copolymer block and contains at least 40% of isoprene units bonding at 1,2- or 3,4-positions relative to the total isoprene units, and the block copolymer (B) contains the polymer block of a styrene (a) in an amount of 5 to 50% by weight, the total amount of said components (A) and (B) being 100 parts by weight; and (III) at least one element selected from the group consisting of (a) silicone oil having a kinematic viscosity of 10 to 30,000 cSt at 25° C. (b) an ester of an aliphatic alcohol and a dicarboxylic acid or a fatty acid and (c) a fluorine polymer in an amount of 0.01 to 10 parts by weight.

18. An olefin thermoplastic elastomer which is partially crosslinked and comprises:

100 to 40% by weight of polymer components comprising:

(I) a crystalline polyolefine resin (A) in an amount of 20 to 85 parts by weight, wherein the crystalline polyolefine resin (A) is a propylene homopolymer or a propylene/α-olefin copolymer having a melt flow rate, measured at 230° C. load of 2.16 kg, of 0.01 to 100g/10 min and a crystallinity, measured by X-ray diffractometry, of 20 to 80%;

(II) a block copolymer or a hydrogenated block copolymer (B) in an amount of 15 to 80 parts by weight, said block copolymers each comprises:

(a) a polymer block of a styrene selected from the group consisting of styrene, α-methylstyrene, 3-methylstyrene, 4-propylstyrene, 4-cyclohexylstyrene, 4-dodecylstyrene, 2-ethyl-4-benzylstyrene and 4-(phenylbutyl)styrene, and (b) a polymer or copolymer block which is an isoprene block or an isoprene/butadiene copolymer block and contains at least 40 of isoprene units bonding at 1,2- or 3,4, positions relative to the total isoprene units, and the block copolymer (B) contains the polymer block of a styrene (a) in an amount of 5 to 50% by weight, and (III) an ethylene/e-olefin copolymer rubber or ethylene/α-olefin/non-conjugated diene copolymer rubber (C) in an amount of 0 to 40 parts by weight, wherein the olefin rubber (C) has a Mooney viscosity, $ML_{1+4}$ (100° C.), of 30 to 150, the total amount of said components (A), (B) and (C) being 100 parts by weight;

(IV) 0 to 40% by weight of a softening agent (E), and 0 to 40% by weight of a filler (F), the total amount of said components (A)+(B)+(C)+(E)+(F) being 100 parts by weight; and (V) at least one element selected form the group consisting of (a) silicone oil having a kinematic viscosity of 10 to 30,000 cSt at 25° C., (b) an ester of an aliphatic alcohol and a dicarboxylic acid or a fatty acid and (c) a fluorine polymer in an amount of 0.01 to 10 parts by weight.

19. An olefin thermoplastic elastomer consisting essentially of:

(I) a thermoplastic elastomer (1) in an amount of 10 to 80 parts by weight, which comprises a crystalline, polyolefin resin (A) in an amount of 5 to 100 parts by weight, and an ethylene/α-olefin copolymer rubber or ethylene/α-olefin/non-conjugated diene copolymer rubber (C) in an amount of 5 to 100 parts by weight and a softening agent (E) in an amount of 3 to 100 parts by weight relative to 100 parts by weight of the total amount of said components (1) and (B) and said copolymer (C) is crosslinked; and (II) a block copolymer or a hydrogenated block copolymer (B) in an amount of 20 to 90 parts by weight, said block copolymer each comprises:

(a) a polymer block of a styrene selected from the group consisting of styrene, α-methylstyrene, 3-methylstyrene, 4-propylstyrene, 4-cyclohexylstyrene, 4-dodecylstyrene, 2-ethyl-4-benzylstyrene and 4-(phenylbutyl)styrene, (b) a polymer or copolymer block which is an isoprene polymer block or an isoprene/butadiene copolymer block and contains at least 40% of isoprene units bonding at 1,2- or 3,4-positions relative to the total isoprene units; and (c) at least one element selected from the group consisting of (a) silicone oil having a kinematic viscosity of 10 to 30,000 cSt at 25° C. (b) an ester of an aliphatic alcohol and a dicarboxylic acid or a fatty acid and (c) a fluorine polymer in an amount of 0.01 to 10 parts by weight relative to 100 parts by weight of the total amount of said component (1) and (B), the total amount of said components (1) and (B) being 100 parts by weight.

20. The olefin thermoplastic elastomer as claimed in claim 19, which further comprises:

(IV) a filler (F), wherein the total amount of said components (A), (B) and (C) being 100 to 40% by weight, the amount of said filler being 0 to 40% by weight, and the total amount of said component (A), (B), (C), (E) and (F) being 100% by weight.

* * * * *